United States Patent
Kamo

(10) Patent No.: US 10,481,435 B2
(45) Date of Patent: Nov. 19, 2019

(54) HORIZONTAL ALIGNMENT-TYPE LIQUID CRYSTAL DISPLAY DEVICE

(71) Applicant: FUJIFILM Corporation, Tokyo (JP)

(72) Inventor: Makoto Kamo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/822,610

(22) Filed: Nov. 27, 2017

(65) Prior Publication Data
US 2018/0081224 A1     Mar. 22, 2018

Related U.S. Application Data

(63) Continuation of application No. PCT/JP2016/065657, filed on May 27, 2016.

(30) Foreign Application Priority Data

May 28, 2015 (JP) ................ 2015-108260
Jan. 18, 2016 (JP) ................ 2016-007236

(51) Int. Cl.
*G02F 1/13363* (2006.01)
*G02F 1/1333* (2006.01)
*G02F 1/1335* (2006.01)

(52) U.S. Cl.
CPC .... *G02F 1/13363* (2013.01); *G02F 1/133305* (2013.01); *G02F 1/133528* (2013.01);
(Continued)

(58) Field of Classification Search
CPC ............................................... G02F 1/13363
See application file for complete search history.

(56) References Cited

U.S. PATENT DOCUMENTS

2005/0110933 A1    5/2005  Jeon et al.
2005/0117090 A1    6/2005  Ito
(Continued)

FOREIGN PATENT DOCUMENTS

JP    S64-000519 A    1/1989
JP    S64-18122 A     1/1989
(Continued)

OTHER PUBLICATIONS

International Search Report issued in PCT/JP2016/065657 dated Aug. 23, 2016.
(Continued)

*Primary Examiner* — Edmond C Lau
(74) *Attorney, Agent, or Firm* — Edwards Neils LLC; Jean C. Edwards, Esq.

(57) ABSTRACT

The present invention provides a horizontal alignment-type liquid crystal display device including a viewing-side polarizing plate; a liquid crystal cell; a backlight-side polarizing plate; and a backlight, in this order, the liquid crystal cell includes a liquid crystal layer held between two substrates, at least any one of the substrates is a resin substrate, the polarizing plate provided on the resin substrate side includes a gas barrier film including a phase difference layer and an inorganic layer, and a polarizer, and the gas barrier film is on the resin substrate side with respect to the polarizer. In the horizontal alignment-type liquid crystal display device according to the present invention, thinning based on the use of the resin substrate is effectively realized, and a liquid crystal cell can be sealed.

7 Claims, 1 Drawing Sheet

(52) U.S. Cl.
CPC ............ *G02F 2001/133562* (2013.01); *G02F 2001/133567* (2013.01); *G02F 2413/02* (2013.01); *G02F 2413/06* (2013.01)

(56) References Cited

U.S. PATENT DOCUMENTS

| | | | | |
|---|---|---|---|---|
| 2006/0279679 | A1* | 12/2006 | Fujisawa | ............ G02B 5/0221 349/116 |
| 2008/0248273 | A1 | 10/2008 | Aiki et al. | |
| 2011/0052892 | A1 | 3/2011 | Murakami | |
| 2013/0169910 | A1* | 7/2013 | Hatano | ............ G02B 5/3083 349/96 |
| 2014/0313456 | A1* | 10/2014 | Fujino | ............ G02F 1/133528 349/62 |
| 2015/0055062 | A1* | 2/2015 | Hisakado | ............ G02F 1/13363 349/96 |
| 2015/0099126 | A1* | 4/2015 | Honda | ............ H01L 51/5253 428/412 |
| 2015/0369981 | A1* | 12/2015 | Takeda | ............ G02B 5/305 359/488.01 |

FOREIGN PATENT DOCUMENTS

| | | |
|---|---|---|
| JP | H08-95016 A | 4/1996 |
| JP | H10-148825 A | 6/1998 |
| JP | 2006-030621 A | 2/2006 |
| JP | 2006-117903 A | 5/2006 |
| JP | 2006-521570 A | 9/2006 |
| JP | 2007-093807 A | 4/2007 |
| JP | 2007-108552 A | 4/2007 |
| JP | 2009-104189 A | 5/2009 |
| JP | 2010-015157 A | 1/2010 |
| JP | 2011-051220 A | 3/2011 |
| JP | 2011-200780 A | 10/2011 |
| JP | 2011-257610 A | 12/2011 |
| JP | 2013-020223 A | 1/2013 |
| JP | 2013-178464 A | 9/2013 |
| WO | 2011/138869 A1 | 11/2011 |

OTHER PUBLICATIONS

Written Opinion issued in PCT/JP2016/065657 dated Aug. 23, 2016.
International Preliminary Report on Patentability completed by WIPO dated Dec. 7, 2017, in connection with International Patent Application No. PCT/JP2016/065657.
Office Action, issued by the Japanese Patent Office dated Dec. 4, 2018, in connection with Japanese Patent Application No. 2017-520809.
Office Action issued by the Japanese Patent Office dated Jul. 23, 2019, in connection with Japanese Patent Application No. 2017-520809.

* cited by examiner

HORIZONTAL ALIGNMENT-TYPE LIQUID CRYSTAL DISPLAY DEVICE

CROSS-REFERENCE TO RELATED APPLICATIONS

This application is a continuation of PCT International Application No. PCT/JP2016/065657 filed on May 27, 2016, which was published under PCT Article 21(2) in Japanese, and which claims priorities under 35 U.S.C § 119 (a) to Japanese Patent Application No. 2015-108260 filed on May 28, 2015 and Japanese Patent Application No. 2016-007236 filed on Jan. 18, 2016, the entire contents of all of which are incorporated herein by reference in their entirety.

BACKGROUND OF THE INVENTION

1. Field of the Invention

The present invention relates to a horizontal alignment-type liquid crystal display device.

2. Description of the Related Art

As a substitution for a glass substrate of a liquid crystal cell of a liquid crystal display device, various resin (plastic) substrates are reviewed. According to the use of the resin substrate, the thinning and the flexibility of the liquid crystal display device can be realized. However, the resin substrate has inferior gas barrier properties shielding oxygen or water vapor than a glass substrate. Therefore, a gas barrier layer is used for sealing in some cases (for example, JP1998-148825A (JP-H10-148825A)). Meanwhile, as the film used for sealing, a gas barrier film including a base material film, an organic layer, and an inorganic layer is widely reviewed (for example, JP2011-51220A).

Generally, in the liquid crystal display device, a polarizing plate is bonded to a liquid crystal cell. There is known a technique for improving display performances of the liquid crystal display device by using an optical compensation film having a specific function as a protective film of this polarizing plate. Various optical properties required for an optical compensation film vary depending on an operation mode or use of a liquid crystal display, and various suggestions have made (for example, Polarizing plate-Phase Difference Film Annual Report, 2014 edition (Yano Research Institute Ltd., published on Apr. 28, 2014)). A horizontal alignment-type operation mode is widely used in a small device such as a smart phone, but several reports have made until now with respect to optical compensation of a horizontal alignment-type liquid crystal display device (for example, JP2006-521570A).

SUMMARY OF THE INVENTION

In a liquid crystal display device having a resin substrate, with a configuration using an optical compensation film for improving display performances together with a gas barrier film for sealing, the number of total layers increases, and it is difficult to sufficiently obtain a thinning effect based on the use of the resin substrate.

Since the horizontal alignment-type liquid crystal display device is widely used in small devices as described above, particularly, it is necessary to try thinning by using a resin substrate. However, even in a case where an optical design according to a report in a related art disclosed in JP2006-521570A derived from a phase difference of a resin substrate is performed in a horizontal alignment-type liquid crystal display device using a resin substrate, there has been a problem in that sufficient optical compensation was not able to be obtained.

An object of the present invention is to provide a horizontal alignment-type liquid crystal display device in which thinning is effectively realized and a liquid crystal cell can be sealed as a horizontal alignment-type liquid crystal display device having a resin substrate. Another object of the present invention is to provide a horizontal alignment-type liquid crystal display device having optical compensation corresponding to a configuration having a resin substrate.

In view of the above circumstances, the present inventors paid attention to a configuration capable of applying an optical compensation function to a polarizing plate protective film together with gas barrier performances and have conducted extensive studies, so as to complete the present invention.

That is, the present invention is to provide [1] to [12] below.

[1] A horizontal alignment-type liquid crystal display device comprising: a viewing-side polarizing plate; a liquid crystal cell; a backlight-side polarizing plate; and a backlight, in this order, in which the liquid crystal cell includes a liquid crystal layer held between two substrates, in which at least any one of the substrates is a resin substrate, in which the polarizing plate provided on the resin substrate side includes a gas barrier film including a phase difference layer and an inorganic layer, and a polarizer, and in which the gas barrier film is on the resin substrate side with respect to the polarizer.

[2] The horizontal alignment-type liquid crystal display device according to [1], in which the resin substrate is on the viewing-side polarizing plate side with respect to the liquid crystal layer.

[3] The horizontal alignment-type liquid crystal display device according to [2], in which a substrate on the backlight-side polarizing plate side with respect to the liquid crystal layer is a glass substrate.

[4] The horizontal alignment-type liquid crystal display device according to any one of [1] to [3], in which retardation of the resin substrate in a thickness direction at a wavelength 550 nm is 50 nm or greater.

[5] The horizontal alignment-type liquid crystal display device according to any one of [1] to [3], in which retardation of the resin substrate in a thickness direction at a wavelength of 550 nm is 70 nm or greater.

[6] The horizontal alignment-type liquid crystal display device according to any one of [1] to [5], in which in-plane retardation of the resin substrate at a wavelength of 550 nm is −10 nm to 10 nm.

[7] The horizontal alignment-type liquid crystal display device according to any one of [1] to [6], in which an inside haze of the phase difference layer is 0.01% to 0.2%.

[8] The horizontal alignment-type liquid crystal display device according to any one of [1] to [7], in which a first phase difference layer satisfying nz≥nx>ny is included as the phase difference layer, and in which a slow axis of the first phase difference layer is parallel to an absorption axis of the polarizer.

[9] The horizontal alignment-type liquid crystal display device according to [8], in which a second phase difference layer satisfying any one of nz>nx=ny or nx=ny>nz is further included as the phase difference layer.

[10] The horizontal alignment-type liquid crystal display device according to any one of [1] to [7], in which a first phase difference layer satisfying nx>nz>ny is included as the phase difference layer.

[11] The horizontal alignment-type liquid crystal display device according to [10], in which a second phase difference layer satisfying nz>nx=ny is further included as the phase difference layer, and in which a slow axis of the first phase difference phase is orthogonal to the absorption axis of the polarizer.

[12] The horizontal alignment-type liquid crystal display device according to any one of [1] to [11], in which the inorganic layer includes at least one inorganic compound selected from the group consisting of silicon nitride, silicon oxide, silicon oxynitride, and aluminum oxide.

According to the present invention, it is possible to provide a horizontal alignment-type liquid crystal display device in which thinning is effectively realized and a liquid crystal cell can be sealed, as a horizontal alignment-type liquid crystal display device having a resin substrate. In the horizontal alignment-type liquid crystal display device according to the present invention, it is possible to perform optical compensation corresponding to a configuration having a resin substrate.

DESCRIPTION OF THE PREFERRED EMBODIMENTS

Figure 1A:
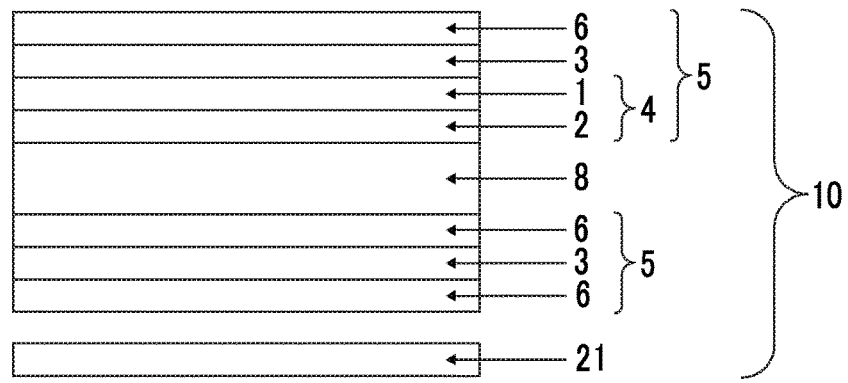
FIGS. 1A to 1C are schematic cross-sectional views of an example of a horizontal alignment-type liquid crystal display device according to the present invention.

Hereinafter, details of the present invention is described. Descriptions of the configurations described below are provided with reference to the representative embodiment according to the present invention, but the present invention is not limited thereto.

In the present specification, a numerical range using "to" means a range including numerical values before and after "to" as a lower limit and an upper limit.

A polarizing plate in the present specification means that a polarizing plate protective film or a functional layer is provided on at least one surface of the polarizer, and the polarizer and the polarizing plate are distinguished from each other to be used.

In the present specification, an "absorption axis" and a "transmission axis" of the polarizer or the polarizing plate mean an axis forming an angle of 90°.

In the present specification, a "slow axis" of a phase difference layer and the like means a direction in which a refractive index becomes maximum.

In the present specification, for example, unless described otherwise, angles such as "45°", "parallel", "vertical", or "orthogonal" mean that a difference from a precise angle is less than 5°. The difference from the precise angle is preferably less than 4° and more preferably less than 3°.

—Retardation—

In the present specification, Re (λ) and Rth (λ) respectively indicate in-plane retardation and retardation in a thickness direction at a wavelength of λ nm. Re (λ) is measured by causing light at a wavelength of λ nm to be incident to KOBRA 21ADH or WR (product name, manufactured by Oji Scientific Instruments) in a film normal direction. With respect to the selection of the measurement wavelength of λ nm, the measurement can be performed by manually exchanging a wavelength selective filter or converting a measured value by a program or the like.

In a case where the measured film is represented by a uniaxial or biaxial index ellipsoid, Rth (λ) is calculated by the following method.

Rth (λ) is calculated in KOBRA 21ADH or WR based on measured retardation, an assumed value of an average refractive index, and an input film thickness value by measuring Re (λ) at total six points by causing light at a wavelength of λ nm to be incident in directions obtained by inclining an in-plane slow axis (determined by KOBRA 21ADH or WR) in 10° steps from the normal direction to one side 50° with respect to the film normal direction as an inclination axis (rotation axis) (in a case where there is not a slow axis, a film in-plane arbitrary direction is set as a rotation axis).

In the above, in a case of a film having a direction in which a value of retardation is zero at a certain tilt angle using an in-plane slow axis as a rotation axis in a normal direction, retardation at a tilt angle greater than the tilt angle is calculated in KOBRA 21ADH or WR after a sign thereof is changed to negative.

The retardation is measured in two arbitrarily inclined directions by using a slow axis as an inclination axis (rotation axis) (in a case where there is not a slow axis, an in-plane arbitrary direction of the film is used as a rotation axis), Rth can be calculated based on the value, an assumed value of an average refractive index, and an input film thickness value in Expressions (1) and (2).

Expression (1)

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}}$$

Expression (2)

$$Rth = \left[\frac{nx+ny}{2} - nz\right] \times d$$

In the expression, Re (θ) represents retardation in a direction inclined by an angle θ from the normal direction. nx represents a refractive index in an in-plane slow axis direction, ny represents a refractive index in an in-plane orthogonal direction to nx, and nz represents a refractive index in a direction orthogonal to nx and ny. d represents a film thickness of the film.

In a case where the measured film cannot be represented by a uniaxial or biaxial index ellipsoid, that is, the film does not have an optic axis, Rth (λ) is calculated in the following method.

Rth (λ) is calculated by KOBRA 21ADH or WR based on measured retardation, an assumed value of an average refractive index, and an input film thickness value by measuring Re (λ) at eleven points by causing light at a wavelength of λ nm to be incident in directions obtained by respectively inclining an in-plane slow axis (determined by KOBRA 21ADH or WR) in 10° steps from +50° to −50° with respect to the film normal direction as an inclination axis (rotation axis).

In the above measurement, values in Polymer Handbook (John Wiley & Sons, Inc) and catalogs of various optical films can be used as the assumed value of the average refractive index. In a case where the value of the average refractive index is not an existing value, the value can be measured by an Abbe refractometer. The value of the average refractive index of the main optical film is exemplified below: cellulose acylate (1.48), cycloolefin polymer (1.52), polycarbonate (1.59), polymethyl methacrylate (1.49), and polystyrene (1.59). nx, ny, and nz are calculated in KOBRA 21ADH or WR by inputting the assumed value of these average refractive indexes and the film thickness. $Nz=(nx-nz)/(nx-ny)$ can be further calculated by these calculated nx, ny, and nz.

<<<Horizontal Alignment-Type Liquid Crystal Display Device>>>

The present invention relates to a horizontal alignment-type liquid crystal display device. The horizontal alignment-type liquid crystal display device is a liquid crystal display device in an operation mode in which switching is performed such that liquid crystal molecules are always horizontal to the substrate in the liquid crystal layer of the liquid crystal cell. This operation mode is generally called an in-plane switching mode (IPS).

The horizontal alignment-type liquid crystal display device includes a viewing-side polarizing plate, a liquid crystal cell, a backlight-side polarizing plate, and a backlight, in this sequence.

Figure 1B:
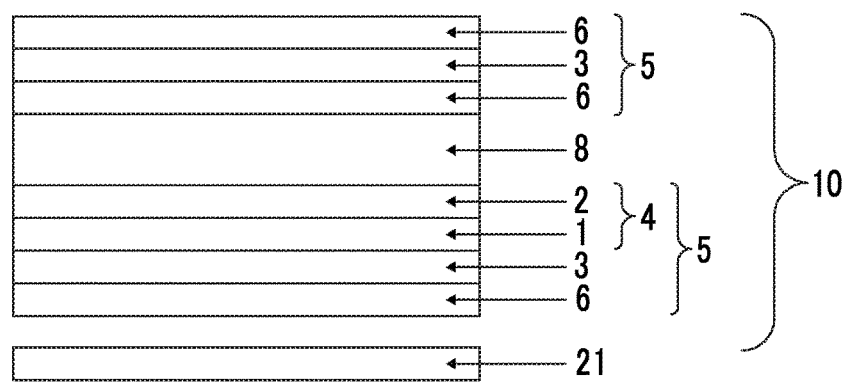
Figure 1C:
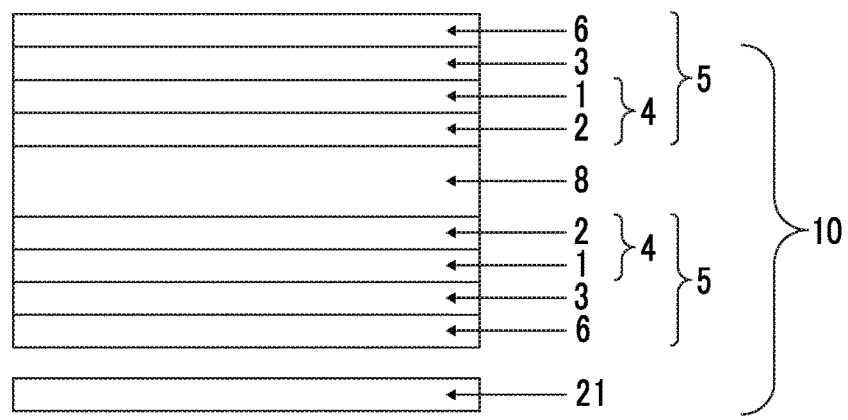

Schematic cross-sectional views of an example of the horizontal alignment-type liquid crystal display device according to the present invention are illustrated in FIGS. 1A to 1C. FIG. 1A illustrates a configuration in which a polarizing plate including a gas barrier film described below is used as a viewing-side polarizing plate. In the polarizing plate 5 including the gas barrier film, a gas barrier film 4 is on a liquid crystal cell 8 side with respect to the polarizer. FIG. 1B illustrates a configuration in which a polarizing plate including a gas barrier film is used as a backlight-side polarizing plate, and FIG. 1C illustrates a configuration in which polarizing plates including gas barrier films are used as a viewing-side polarizing plate and a backlight-side polarizing plate.

Though not illustrated in the drawings, adhesive layers may be included between the polarizing plate and the liquid crystal cell, between the polarizer and the polarizing plate protective film, and between the polarizer and the gas barrier film. The horizontal alignment-type liquid crystal display device according to the present invention may include other materials, if necessary. For example, surface layers such as a forward scattering layer, a primer layer, an antistatic layer, and an undercoat layer may be disposed together with (or instead of) a color filter substrate, a thin layer transistor substrate, a lens film, a diffusion sheet, a hard coat layer, an antireflection layer, a low reflection layer, and an antiglare layer.

<<Liquid Crystal Cell>>

The liquid crystal cell includes two substrates a liquid crystal layer held between the two substrates.

The liquid crystal layer includes a liquid crystal molecule that may be horizontal to the substrate.

The two substrates are generally disposed to face each other. In the horizontal alignment-type liquid crystal display device according to the present invention, at least one of the two substrates is a resin substrate. In a case where one of the two substrates is a resin substrate, the other may be a glass substrate, for example. In a case where one of the two substrates is a resin substrate, any one substrate on a viewing side and a backlight side with respect to the liquid crystal layer may be a resin substrate. Both on the viewing side and the backlight side may be resin substrates. In the horizontal alignment-type liquid crystal display device according to the present invention, the polarizing plate provided on the resin substrate side with respect to the liquid crystal layer is a polarizing plate including a gas barrier film described below. According to this configuration, as described below, the liquid crystal cell is effective sealed, and optical compensation suitable for optical properties of the used resin substrate can be realized by the polarizing plate including the gas barrier film.

As the as described below, as the horizontal alignment-type liquid crystal display device according to the present invention, only the substrate on the viewing side with respect to the liquid crystal layer is preferably a resin substrate.

The liquid crystal cell may include a color filter layer, if necessary.

<Resin Substrate>

The resin substrate is not particularly limited, but a transparent resin substrate is preferable. The transparent substrate may be a substrate having total luminous transmittance with respect to a visible light region (a wavelength region of 400 nm to 800 nm) of about 80% or greater.

As the resin substrate, for example, substrates disclosed in WO2013/080495A can be preferably used. Specifically, examples thereof include a polyimide resin, a polyparaxylene resin, and an acrylic resin, and particularly, a polyimide resin is preferable. As the polyimide resin, for example, an aromatic polyimide resin, an aromatic (carboxylic acid component)-cycloaliphatic (diamine component) polyimide resin, a cycloaliphatic (carboxylic acid component)-aromatic (diamine component) polyimide resin, a cycloaliphatic polyimide resin, and a fluorinated aromatic polyimide resin can be used.

Generally, as the resin substrate used as the substrate of the liquid crystal cell, in view of the display performance, a plastic material having small in-plane retardation is generally used, but a plastic material also having small Rth (550) (for example, 5 nm or less) is rare. Among commercially available materials, considering a material in which in-plane retardation is small, and heat resistance, transparency, strength, toughness, mass, and thickness required for the substrate are satisfied, Rth (550) of the resin substrate is preferably 50 nm or greater and more preferably 70 nm or greater. For example, Rth (550) is preferably 300 nm or less, more preferably 250 nm or less, and even more preferably 200 nm or less. This is because, due to strong interaction between plastic molecules, heat resistance, strength, and toughness can be realized, but under the condition in which the in-plane alignment of the molecule is preferably as random as possible in order to cause the in-plane retardation to be small, strong alignment in the thickness direction is preferable. This is also because, in a case where Rth (550) is 300 nm or less, optical compensation using a currently available retardation film is possible. The absolute value of Re (550) of the resin substrate is preferably small, and for example, Re (550) is preferably −10 nm to 10 nm. The liquid crystal display device having high display performance can be obtained by adjusting optical properties of the phase difference layer in the gas barrier film described below according to Rth and Re included in the resin substrate.

The resin substrate preferably has flexibility. For example, the horizontal alignment-type liquid crystal display device having flexibility can be obtained by causing both substrates on the viewing side and the backlight side to be resin substrates.

<<Polarizing Plate>>

The horizontal alignment-type liquid crystal display device according to the present invention includes a viewing-side polarizing plate and a backlight-side polarizing plate. Both of the viewing-side polarizing plate and the backlight-side polarizing plate include polarizers. The absorption axes of the polarizers are preferably in a relationship of crossed nicols of being orthogonal to each other. According to the present specification, the expression "two polarizing plates are in a relationship of crossed nicols" means that the absorption axes of the polarizer of these polarizing plates are orthogonal to each other.

The horizontal alignment-type liquid crystal display device according to the present invention include a polarizing plate including a polarizer and a gas barrier film as the polarizing plate. As described above, one or both selected from the group consisting of the viewing-side polarizing plate and the backlight-side polarizing plate may be polarizing plates including gas barrier films. The horizontal alignment-type liquid crystal display device according to the present invention may have a polarizing plate including at least one gas barrier film and may additionally have another polarizing plate that does not include a gas barrier film. As the other polarizing plate, for example, a polarizing plate in which another polarizing plate protective film described below is bonded on one surface or both surfaces of the polarizer. The other polarizing plate that does not have a gas barrier film may also have a phase difference layer. As the phase difference layer at this point, a phase difference layer which is the same as the phase difference layer in the gas barrier film may be used, or a different phase difference layer may be used. However, a different phase difference layer is preferably used.

The polarizing plate including a polarizer and a gas barrier film may have a configuration of having a gas barrier film on at least one surface of the polarizer, and the polarizing plate protective film may be bonded to the other surface.

<Gas Barrier Film>

In the horizontal alignment-type liquid crystal display device according to the present invention, the gas barrier film is on the resin substrate side with respect to the polarizer. That is, in the polarizing plate, the gas barrier film is on the liquid crystal cell side (inner side) with respect to the polarizer. According to the configuration, the penetration path of oxygen and water vapor can be extremely reduced. In the polarizing plate, an adhesive layer used for the adhesion between the polarizing plate and the liquid crystal cell is provided on the gas barrier film side. According to this configuration, it is possible to obtain an effect of reducing the path for penetration of oxygen or water vapor from a side surface of the polarizing plate to the liquid crystal cell. It is possible to obtain an effect of suppressing the peeling between the respective layers, deterioration of performance of the polarizer, and deterioration of an image display element in advance which are caused by the trapping of a small amount of dissolved oxygen or dissolved water vapor, which remains in the polarizer and the like, between the liquid crystal cell and the barrier film.

[Phase Difference Layer]

In the horizontal alignment-type liquid crystal display device according to the present invention, the gas barrier film includes a phase difference layer. The phase difference layer is a layer in which at least one of Rth (550) or Re (550) is 20 nm or greater. The gas barrier film may have one phase difference layer or may have two or more phase difference layers. In a case where the gas barrier film has two or more phase difference layers, the two or more layers may be adjacent to each other or another layer may be included between the two or more layers. For example, a gas barrier film preferably includes an inorganic layer between the two phase difference layers.

The inside haze of the phase difference layer is preferably in the range of 0.01 to 0.3% and more preferably in the range of 0.01 to 0.2%. In a case where the inside haze of the phase difference layer is in the above range, it is possible to obtain a polarizing plate that can realize an image display device having excellent contrast and excellent brightness.

In the present specification, the inside haze is a value obtained by dropping several drops of silicone oil on the both surfaces of a film sample, interposing the film sample between two glass plates (MICRO SLIDE GLASS, product number S9111, manufactured by MATSUNAMI Glass Ind., Ltd.) having a thickness of 1 mm from the front and back surfaces, optically and closely attaching two sheets of the glass plate and the film sample to each other, measuring the haze in a state in which surface haze is removed, and subtracting the haze independently measured by interposing only silicone oil between two glass plates.

For example, an aspect in which Re (550) of the protective film on the liquid crystal cell side included in the backlight-side polarizing plate is −10 to 10 nm and Rth (550) is in the range of −10 to 10 nm, and Re (550) of the phase difference layer included in the viewing-side polarizing plate is 200 to 350 nm, and Rth (550) is in the range of −50 to 50 nm is also one of the preferable aspects. A material of the phase difference layer is not particularly limited, and, for example, films disclosed in JP2013-539076A and JP2009-122151A can be used.

Particularly, as described above, with respect to a case where a substrate having small in-plane retardation (for example, Re (550) is −10 to 10 nm) and having Rth (550) of 50 nm or greater is used in the resin substrate, simulation results in a case where Rth (550) of the substrate is assumed are described in the examples. As understood from the simulation results, as the optical compensation method, in a case where Rth (550) of the substrate is greater than 90 nm, a method of combining a negative A-plate (nz=nx>ny) and a positive C-plate (nz>nx=ny), a method of combining a positive A-plate (nx>ny=nz) and a positive C-plate, and a method of combining a positive biaxial film having an Nz coefficient of 0.5 (nx>nz>ny) and a positive C-plate are possible. In a case where Rth (550) of the substrate is about 90 nm, satisfactory display performances can be obtained with one negative A-plate.

Specifically, according to a first aspect in a case where a substrate having small in-plane retardation (for example, Re (550) is −10 to 10 nm) and having Rth (550) of 50 nm or greater is used in the resin substrate, the gas barrier film preferably includes a first phase difference layer satisfying nz≥nx>ny as the phase difference layer. The first phase difference layer is preferably nz=nx>ny. At this point, the slow axis of the first phase difference layer is preferably parallel to the absorption axis of the polarizer in the polarizing plate having the same gas barrier film. As the phase difference layer, it is preferable that the gas barrier film having the first phase difference layer satisfying nz≥nx>ny further includes a second phase difference layer satisfying any one of nz>nx=ny or nx=ny>nz as the phase difference layer. At this point, the phase difference layer closer to the polarizer in the polarizing plate including the same gas barrier film is the first phase difference layer and preferably has the second phase difference layer on the resin substrate side than the first phase difference layer. In a case where Rth (550) of the resin substrate is about 90 nm or less, the second phase difference layer preferably satisfies nx=ny>nz, and in a case where Rth (550) of the resin substrate is about 130 nm or greater, the second phase difference layer preferably satisfies nz>nx=ny.

As the second aspect in a case where a substrate having small in-plane retardation (for example, Re (550) is −10 to 10 nm) and having Rth (550) of 50 nm or greater is used in the resin substrate, the gas barrier film preferably includes the first phase difference layer satisfying nx>nz>ny as the phase difference layer. In this case, it is preferable that a slow axis of a first phase difference phase is orthogonal to an absorption axis of the polarizer in the polarizing plate having the same gas barrier film. It is preferable that the gas barrier film including the first phase difference layer satisfying nx>nz>ny as the phase difference layer further include the second phase difference layer satisfying nz>nx=ny. At this point, it is preferable that a phase difference layer that is closer to the polarizer in the polarizing plate including the same gas barrier film is the second phase difference layer, and the first phase difference layer is provided on the resin substrate side than the second phase difference layer.

As a third aspect in a case where a substrate having small in-plane retardation (for example, Re (550) is −10 to 10 nm) and having Rth (550) of 50 nm or greater is used in the resin substrate, it is preferable that the gas barrier film includes the first phase difference layer satisfying nx>ny=nz as the phase difference layer and the slow axis is orthogonal to the absorption axis of the polarizer in the polarizing plate having the same gas barrier film. At this point, the second phase difference layer satisfying nz>nx=ny may be further included.

The phase difference layer having respective optical properties and other characteristics and the manufacturing method of the phase difference layer are described below.

(Phase Difference Layer Having Refractive Index Difference of nz≥nx>ny)

Examples of the phase difference layer having the refractive index difference of nz≥nx>ny include a stretched product of a film consisting of a polymer material having negative intrinsic birefringence and a liquid crystal alignment fixed layer. As the polymer material having negative intrinsic birefringence, materials disclosed in 0016 to 0045 of JP2013-134337A can be used. Specifically, in view of capability of solution film formation and high Rth developing properties, a polystyrene-based resin, a polyester-based resin, and a cellulose acylate resin containing an aromatic ring are preferable. Polycarbonates and an acrylic resin may be used.

Examples of the coating material include a liquid crystal alignment fixed layer in which a discotic liquid crystal compound is vertically aligned. According to the present specification, the "liquid crystal alignment fixed layer" is a layer distinguished from the liquid crystal layer in the liquid crystal cell. The liquid crystal alignment fixed layer may be a layer in which the alignment of the liquid crystal compound is maintained and generally may be a layer which is changed to a state in which a polymerizable liquid crystal compound is aligned and which is changed to a state in which a layer without fluidity is formed by polymerization and curing due to ultraviolet irradiation, heating, or the like, and alignment formation is not changed simultaneously or by an external field or an external force. In the liquid crystal alignment fixed layer, it is sufficient that optical properties based on the alignment of the liquid crystal compound is maintained in the layer, and the liquid crystal compound in the layer may not exhibit liquid crystallinity. For example, the polymerizable liquid crystal compound may be caused to have a high molecular weight by a curing reaction so as to lose liquid crystallinity.

The liquid crystal alignment fixed layer obtained by vertically aligning the discotic liquid crystal compound can be manufactured with reference to the disclosure in 0030 to 0100 and 0102 to 0206 of JP2012-18395A.

(Phase Difference Layer Having Refractive Index Difference of nx>ny≥nz)

Examples of the phase difference layer having a refractive index difference of nz≥nx>ny include a film consisting of a polymer material having a positive intrinsic birefringence or a liquid crystal alignment fixed layer. Examples of the polymer material having a positive intrinsic birefringence include cellulose acylate, an alicyclic olefin polymer, polycarbonate, polyester, polyimide, polyethylene, and polypropylene. With respect to the cellulose acylate, 0081 to 0084 of JP2013-134337A can be referred to, and with respect to the alicyclic olefin polymer, 0019 to 0028 of JP2014-191156A can be referred to.

Examples of the liquid crystal alignment fixed layer include a liquid crystal alignment fixed layer in which rod-like liquid crystal compounds are horizontally aligned. With respect to the liquid crystal alignment fixed layer in which rod-like liquid crystal compounds are horizontally aligned, 0111 an 0195 to 0206 of JP2012-18395A can be referred to.

(Phase Difference Layer Having Refractive Index Difference of nz>nx=ny)

Examples of the phase difference layer having a refractive index difference of nz>nx=ny include a film obtained by aligning polymer materials having negative intrinsic birefringence in a thickness direction described above and a liquid crystal alignment fixed layer obtained by vertically aligning rod-like liquid crystal.

Examples of the method of aligning polymer materials having negative intrinsic birefringence in a thickness direction include an alignment method of controlling the movement of the polymer accompanied by the removal of a solvent in a case of solution casting or an alignment method of biaxially stretching a film formed by solution casting or melting film formation in advance.

A liquid crystal alignment fixed layer obtained by vertically aligning rod-like liquid crystal can be obtained by adding a vertical alignment accelerating agent to the rod-like liquid crystal compound described above or applying a liquid crystal alignment fixed layer on a vertical alignment film.

(Phase Difference Layer Having Refractive Index Difference of nx=ny>nz)

Examples of the phase difference layer having refractive index difference of nx=ny>nz include a film obtained by aligning polymer materials having positive intrinsic birefringence described above in a thickness direction.

As the method of aligning polymer materials having positive intrinsic birefringence in a thickness direction, a method of aligning polymer materials having negative intrinsic birefringence in a thickness direction can be diverted.

(Phase Difference Layer Having Refractive Index Difference of nx>nz>ny)

As the method of obtaining the phase difference layer having refractive index difference of nx>nz>ny, in-plane alignment and thickness direction alignment of various polymer materials described above may be obtained by combining the methods described above or adjusting the conditions.

(Other Characteristics of Phase Difference Layer)

In addition to the optical properties described above, with respect to the phase difference layer, materials are selected based on a tensile modulus of elasticity, elongation at break, surface hardness, brittleness, photoelastic coefficient, and the like, if necessary.

Particularly, with respect to the brittleness, considering handleability in the operation and a case where the display device according to the present invention is exposed to an operation such as bending, brittleness is preferably low. The brittleness can be evaluated by a folding test. For example, folding is repeated by a folding endurance testing machine in conformity with JIS-C6471, and the evaluation can be performed based on the number of times of folding required for the breaking of the film (as the number of times of folding is greater, brittleness is lower, that is, stronger). In a case where folding is repeated at 135° per side at a rate of 175 times per minute with applied load of 4.9 N in the curvature radius of folding of 2.0 mm by a folding endurance testing machine in conformity with JIS-C6471, the film preferably endures 50 or more times of folding, more preferably endures 100 or more times of folding, and particularly preferably endures 500 or more times of folding.

It is preferable that the photoelastic coefficient of the phase difference layer is small. If the photoelastic coefficient is great, in a case where the liquid crystal panel is bent or in a case where external force such a finger pressure or pressure to a bezel is applied to the liquid crystal panel, the phase difference changes, so as to cause light leak. The photoelastic coefficient is preferably $14 \times 10^{-12}$ $Pa^{-1}$ or less, more preferably $10 \times 10^{-12}$ $Pa^{-1}$ or less, and particularly preferably $5 \times 10^{-12}$ $Pa^{-1}$ or less.

(Method of Producing Phase Difference Layer)

The phase difference layer can be produced by using a solution film formation method or a melt film formation method or by coating a support independently prepared with a phase difference layer. The phase difference layer may be formed in a long continuous film shape or may be formed in a sheet shape. In view of maintaining productivity and evenness of product performances, it is preferable to form the film in a long continuous film shape.

The solution film formation method at least includes a step of preparing a solution (called dope) obtained by dissolving a polymer to be used in a solvent and a step of casting the dope to form a film. With respect to a general solution casting method, JIII Journal of Technical Disclosure Monthly (Disclosure Technique No. 2001-1745, published on Mar. 15, 2001, Japan Institute of Invention and Innovation) can be referred to.

The dope is prepared by dissolving the polymer and various additives in a solvent that can dissolve the polymer to be used and various additives to be added if necessary. In a case of preparing, heating and cooling, pressurizing, stirring, shaking, an ultrasonic treatment, and the like can be added. Concentration, filtration, and defoaming treatments are preferably performed, and the treatments can be suitably changed to be used according to the materials to be used with reference to the specific disclosure on page 25 in JIII Journal of Technical Disclosure Monthly (Disclosure Technique No. 2001-1745, published on Mar. 15, 2001, Japan Institute of Invention and Innovation).

The obtained dope is sent from a storage pot to a pressure-type die, for example, through a pressurized quantitative gear pump that can deliver the liquid a fixed amount with a high precision at a rotation speed, the dope is uniformly casted on the metal support (a band or a drum) of a casting portion endlessly traveling from a pump adaptor (slit) of the pressure-type die, and the doped film (also referred to as web) is peeled off from the metal support at a peeling point at which the metal support has reached almost one turn, so as to obtain a film. If necessary, both ends of the peeled web are held with clips, the peeled web is transported to a tenter with the width maintained and dried, the web is subsequently transported to a group of rollers of a drying device and dried, a knurling (embossing) process is performed after trimming, and the web can be wound up in a predetermined length with a winding machine.

In the casting step, single layer casting may be performed with one kind of dope, two or more kinds of different dope may be co-casted simultaneously or sequentially.

The melting film formation method at least includes a step of obtaining a polymer melt (referred to as melt) by preparing the polymer to be used and an additive to be added if necessary as pellets mixed in advance or mixing a melt polymer and an additive in a kneading machine and performing heating and a step of causing the obtained melt to be discharged from the die so as to make a film and winding the film with cooling. It is preferable to continuously perform a step of obtaining the melt and a step of making the film.

Before the step of obtaining the melt, the material to be used is sufficiently dried and moisture and volatile matters are removed. In a case where the operation is performed, the generation of troubles on the surface such as the generation of air bubbles or silver streak can be prevented. The melting is preferably caused to pass through a metal mesh so as to remove unmelted matters and foreign matters.

In the coating film forming method, various coating methods can be used. In the preparation of the coating liquid, the defoaming treatment or the filtration treatment is preferably performed in the same manner as in the preparation of the dope described above, in view of preventing troubles on the surface.

As described below according to the present invention, since the inorganic layer is provided on the phase difference layer in some cases, it is preferable that the surface of the phase difference layer does not have protruding foreign matters. In this point of view, a solution casting method and a coating film forming method in which foreign matters and insoluble matters can be easily removed by filtration are preferably used. Even in the melting film formation method, foreign matters can be removed by filtration of the melt. However, the melting film formation method is preferably performed, such that foreign matters such as unmelted matters caused by filtration pressure or shearing by using a screw of an extruder or sediments adhered to a discharge port of a die are not mixed into the melt.

As described above, since the phase difference layer may have a flat surface without protruding foreign matters, in a case where a film used for causing the support to be the phase difference layer or a film obtained by providing the phase difference layer on the support is wound up in a long length as a wound body, there is a concern of causing "blocking" in which the film adheres with each other. Therefore, it is possible to take a measurement of providing an anti-blocking layer (also referred to as a mat layer) provided with moderate irregularities on a surface opposite to the smooth surface or a measurement of providing the film for the use by temporarily covering the smooth surface with an easily peelable protective film or the like before winding up, performing winding, and removing the protective film for the use.

(With Respect to the Other Optical Compensation Method)

In the present specification, the horizontal alignment-type liquid crystal display device is particularly described, but the polarizing plate described in the present specification can be applied to vertically aligned (VA) liquid crystal display devices or twisted nematic (TN) or super twisted nematic (STN) liquid crystal display devices.

[Support and Organic Layer]

The phase difference layer may be a support in the gas barrier film or may be another organic layer. In the gas barrier film, the support is a layer provided for maintaining an inorganic layer or a barrier laminate consisting of an inorganic layer and an organic layer. The organic layer is a layer that may be provided between a support and an inorganic layer, on a surface that is not on a support side of an inorganic layer, and between a plurality of inorganic layers. It is preferable that the support is at least a phase difference layer.

It is preferable that the phase difference layer which is the support does not consist of the liquid crystal alignment fixed layer only. Examples of the support that is not the phase difference layer include a glass plate and a film with a PMMA resin or a cycloolefin polymer (for example, ZEONOR (product name) that can be obtained from Zeon Corporation) as a material.

The phase difference layer which is an organic layer may be a layer including a polymer material or a liquid crystal material that can be used as the phase difference layer described above. Specifically, a layer obtained by aligning a material having negative intrinsic birefringence in a thickness direction, a vertical alignment liquid crystal alignment fixed layer of a discotic liquid crystal compound, a vertical alignment liquid crystal alignment fixed layer of a rod-like liquid crystal compound, a horizontal alignment liquid crystal alignment fixed layer of a rod-like liquid crystal compound, and the like are preferable.

For the purpose of improving the smoothness of the surface, improving interlayer adhesiveness, and providing scratch resistance, and the like, various other existing materials may be applied to the organic layer.

The method of manufacturing an organic layer is not particularly limited, and, for example, the organic layer can be manufactured by coating the support of the inorganic layer with a composition consisting of a polymer, a polymerizable compound, a polymerization initiator, a leveling agent, other additives, a solvent, and the like. As the coating method, various existing coating method in the related art can be applied.

In addition, as the organic layer, paragraphs 0020 to 0042 of JP2007-290369A, paragraphs 0074 to 0105 of JP2005-096108A, and 0128 of JP2015-61759A can be referred to.

In a case where an organic layer is formed on an inorganic layer, in view of improving the adhesiveness, a silane coupling agent, an urethane oligomer, epoxide, and the like are preferably used.

An average refractive index or a phase difference of the organic layer is not particularly limited. A refractive index can be suitably adjusted so as to reduce the reflection on the respective interfaces. The phase difference may be in-plane phase difference or thickness direction phase difference, may exist, or may not exist. For example, the phase difference of the organic layer may be used together in addition to the phase difference of the support, such that the preferably phase difference is exhibited as the entire gas barrier film.

The film thickness of the organic layer is not particularly limited. In view of the compatibility of performances of the organic layer as the gas barrier film, the film thickness is preferably 50 nm to 3,000 nm and more preferably 200 nm to 2,000 nm.

The glass transition temperature of the organic layer is not particularly limited. In a case where the inorganic layer is vapor-deposited after the organic layer is formed, the glass transition temperature is preferably 120° C. or greater in view of endurance at high temperature.

[Inorganic Layer]

With respect to the horizontal alignment-type liquid crystal display device according to the present invention, the gas barrier film includes an inorganic layer.

The inorganic layer is not particularly limited, and various well-known inorganic layers may be used. As the material of the inorganic layer, various well-known materials can be used, as long as the material is used in the inorganic layer of the gas barrier film, and specific examples thereof include inorganic compounds such as metal oxide such as aluminum oxide, magnesium oxide, tantalum oxide, zirconium oxide, titanium oxide, and indium tin oxide (ITO); metal nitride such as aluminum nitride; metal carbide such as aluminum carbide; silicon oxide such as silicon oxide, silicon oxynitride, silicon carbide, silicon oxynitride, and silicon carbide; silicon nitride such as silicon nitride and silicon nitride carbide; silicon carbide such as silicon carbide; hydride thereof; a mixture of two or more of these; and a hydrogen-containing substance thereof.

Particularly, silicon nitride, silicon oxide, silicon oxynitride, and aluminum oxide are highly transparent and dense, and thus are preferable. Among these, particularly, silicon nitride is denser and thus is highly transparent and preferable.

The method of producing an inorganic layer is not particularly preferable, and various well-known methods can be used. Particularly, a plasma sputtering method or a chemical vapor deposition method (CVD method) is preferable.

The film thickness of the inorganic layer is not particularly limited, and the film thickness may be about 3 nm to 300 nm. In view of gas barrier properties, the film thickness is preferably 10 nm or greater. In view of breaks and cracks, the film thickness is preferably 200 nm or less.

The inorganic layer can be formed on the surface of the phase difference layer and the like described above. At this point, the surface on which the inorganic layer is formed is preferably smooth. This is because, in a case where steep unevenness exists, defects are generated in the inorganic layer, and thus gas barrier properties decrease. The number of protrusions protruding at a height of 1 μm or more with respect to the reference surface of the surface is preferably less than one with respect to an average obtained by randomly measuring 10 fields of view of 1 mm$^2$.

It is known that gas barrier properties of the obtained inorganic layer change due to surface energy on the surface on which the inorganic layer is formed. Generally, it is known by experience that in a case where the surface energy is close to or slightly smaller than the surface energy of the inorganic layer (generally around 50 mN/m), an inorganic layer that is denser and excellent in interlayer adhesiveness can be obtained. The surface energy of the support and the organic layer can generally be determined by measuring a contact angle of water and a contact angle of methylene iodide (Zisman plot). The surface energy that can be obtained in this manner is preferably in the range of 39 to 55 mN/m and more preferably in the range of 41 to 50 mN/m.

A smoothing layer may be provided in order to smooth the surface on which the inorganic layer is formed and also adjust the surface energy.

The smoothing layer can include various solution applicable polymers and polymerized products of polymerizable monomers. The smoothing layer can smoothen the surface of the support or the organic layer by wet spreading thereof. In addition, in order to improve the adhesiveness to the adjacent layer, it is preferable to use a material that permeates the support or the organic layer or a high polarity material.

Specific examples of the material of the smoothing layer include a cured product of a composition in which photopolymerizable acrylate is included as a main component and an acrylate having a polar group such as a phosphoric acid group, a urethane group, or a hydroxyl group in a molecule is used together as an adhesion improver, and photopolymerizable acrylate. Since the film is neutral and the corrosion of the inorganic layer is small, it is preferable to use a photopolymerizable acrylate. The surface energy of the surface of the obtained smoothing layer is preferably in the range of 39 to 55 mN/m and more preferably in the range of 41 to 50 mN/m.

<Polarizer>

The polarizer is not particularly limited, and may be a so-called linear polarizer having a function of converting natural light into specific linearly polarized light. The polarizer is not particularly limited, and an absorption-type polarizer can be used.

The material of the polarizer is not particularly limited, and a polarizer that is generally used can be used. For example, any one of an iodine-based polarizer, a dye-based polarizer utilizing a dichroic dye, and a polyene-based polarizer can be used.

Particularly, in a case where an inorganic layer is vapor-deposited after a polarizer is disposed on a phase difference layer (support) of a gas barrier film, and the like, it is preferable to use a dye-based polarizer using a thermotropic liquid crystalline dichroic coloring agent which have excellent heat resistance so as to endure a high temperature in a case of vapor deposition.

A method of manufacturing a dye-based polarizer using a thermotropic liquid crystalline dichroic coloring agent is not particularly limited. However, for example, an alignment film is formed on a phase difference layer (support) of a gas barrier film, and a dye-based polarizer can be manufactured by applying a composition consisting of a thermotropic liquid crystalline dichroic coloring agent, an alignment agent, a leveling agent, other additives, a solvent and the like.

As the thermotropic liquid crystalline dichroic coloring agent, for example, a thermotropic liquid crystalline dichroic coloring agent disclosed in JP2011-237513A can be suitably used.

The glass transition temperature of the polarizer is not particularly limited. In a case where an inorganic layer is vapor-deposited after a polarizer is disposed, the glass transition temperature is preferably 120° C. or greater so as to endure a high temperature in a case of vapor deposition.

<Other Polarizing Plate Protective Films>

In a polarizing plate including a gas barrier film, a surface of a polarizer opposite to a surface bonded to a gas barrier film is preferably provided with an existing polarizing plate protective film. As the existing polarizing plate protective film, various well-known polymer films such as polyethylene terephthalate (PET), a cycloolefin polymer (COP), triacetyl cellulose (TAC), an acrylic polymer, polystyrene, polycarbonate, and polyimide can be used. Instead of the existing polarizing plate protective film, a polarizing plate protective layer such as a hard coat layer may be provided. In a liquid crystal display device according to the present invention, the same polymer film may be selected as a polarizing plate other than the polarizing plate including the gas barrier film so as to be used as a polarizing plate protective film. The polarizing plate protective film may be provided in a polarizer in advance, as a polarizing plate and may be provided in a polarizer in the course of producing the liquid crystal display device according to the present invention.

<Method of Manufacturing Polarizing Plate>

The method of manufacturing a polarizing plate is not particularly limited. For example, a phase difference layer is provided on the surface of the polarizer such that an inorganic layer is laminated on one surface of a polarizing plate of this phase difference layer or a gas barrier film independently manufactured may be bonded to a polarizer. In these cases, a polarizing plate protective film may be provided on the other surface of the polarizer. The polarizer based on the thermotropic liquid crystalline dichroic coloring agent may be provided on one surface of the gas barrier film.

<<Adhesive Layer>>

In the liquid crystal display device according to the present invention, adhesive layers may be provided for adhesion of respective layers. The adhesive layer may consist of an adhesive. As the adhesive used in the liquid crystal display device according to the present invention, an existing pressure sensitive adhesive can be used, and examples thereof include a pressure sensitive adhesive, an energy ray-curable adhesive, and a thermosetting adhesive. These adhesives may be provided by being directly applied to the gas barrier film and may be provided by transferring an adhesive layer provided in advance in a film shape. The thickness of the adhesive layer is preferably about 2 μm to 30 μm. If necessary, various functional additives such as an adhesion improver, an antistatic agent, an optical property modifier, a polarizing sheet durability improver, an oxygen absorber, and a water absorption agent may be included.

Examples of the material include various materials such as an acrylic material, an epoxy-based material, an urethane-based material, an alkoxysilane-based material, a cyanoacrylate-based material, and a polyvinyl alcohol-based material. For example, an adhesive consisting of a mixture of alkoxysilane having an amino group and alkoxysilane having an epoxy group exhibits strong adhesion force regardless of a bonding target and thus can be suitably used. In a 90° peeling test, the adhesion force between bonded films and layers is preferably an adhesion force of 4 N/10 mm width or greater and more preferably an adhesion force of 5 N/10 mm width or greater.

<<Other Layers>>

In addition to the above, an undercoat, a light diffusion layer, an antiglare layer, an antireflection layer, a hard coat layer, an antifouling layer, an antistatic layer, a conductive layer, a getter layer, an easily peelable liner, and the like may be applied to the horizontal alignment-type liquid crystal display device according to the present invention, if necessary. The application position may be provided without limitation if necessary, such as between components or on the surface of the polarizing plate.

For example, a case where a conductive layer is provided for the purpose of applying a touch panel function is described. As the conductive layer in this case, a layer having excellent transparency is preferably used as a layer in which display performances as the horizontal alignment-type liquid crystal display device is maintained. Examples thereof include an indium-based oxide conductive layer (ITO) and a fine wiring pattern layer of metal such as silver or copper. In view of productivity and low electric resistance, an aspect in which a fine wiring pattern layer of metal such as silver or copper is used is one of preferable aspect. A support provided with the metal fine wiring pattern layer and a production method thereof are disclosed, for example, in JP2014-168886A or publications cited in the publication. The conductive layer in the horizontal alignment-type liquid crystal display device according to the present invention may be provided in the support of the gas barrier film and may be provided on the other polarizing plate protective film.

<<Backlight>>

As a backlight, a well-known backlight that can be applied to a horizontal alignment-type liquid crystal display device can be used. The configuration of the backlight may be an edge light mode having a light guide plate or a reflective plate as a constituent member or a direct backlight mode. The backlight preferably includes various reflection members, diffusing plates, and diffusion sheets, prism sheets (for example, BEF), and light guides, in addition to the light source. With respect to the other members, disclosures in JP3416302B, JP3363565B, JP4091978B, JP3448626B, and the like can be referred to.

EXAMPLES

The present invention is described in detail with reference to the examples below. Materials, reagents, amounts of substances and proportions thereof, operations, and the like provided in the following examples can be suitably changed without departing from the gist of the present invention. Therefore, the scope of the present invention is not limited to the following examples.

<Optical Simulation>

The liquid crystal display device of the present invention was evaluated by simulation.

In the simulation, the extended Jones matrix method was applied, and the liquid crystal panel configuration was simplified only to the substrate of the liquid crystal cell on the viewing side, the liquid crystal in the cell, and the polarizing plate on the viewer side, and calculation was performed.

First, various kinds of optical compensation were examined setting Rth (550) of the liquid crystal cell substrate on the viewing side to 200 nm and using a protective film (optical compensation film) on the liquid crystal cell side with respect to the polarizer in the polarizing plate on the viewing side. With the simulator, in the configuration without the optical compensation film in a case of a double-sided glass substrate (zero phase difference), in a state in which the liquid crystal cell is a black display, the light leak amount of 550 nm in a case of being viewed from an azimuthal angle of 45° and a polar angle of 60° was set to 1, and the relative light leak amounts in various optical compensation configurations were calculated. In the evaluation, as the relative light leak amount was smaller, the optical compensation configuration was more excellent. The results thereof are provided in Table 1. In Table 1, with respect to phase difference layers A and B, in the optical compensation film, it is assumed that the substrate on the viewing side, a phase difference layer A, a phase difference layer B, and a polarizer were disposed in this order.

TABLE 1

| Compensation configuration | Substrate Rth | Phase difference layer A | | Slow axis disposition | Anisotropic | Phase difference layer B | | Slow axis disposition | Anisotropic | Relative light leak amount |
| --- | --- | --- | --- | --- | --- | --- | --- | --- | --- | --- |
| | | Re | Rth | | | Re | Rth | | | |
| 1 | 200 | 0 | −150 | — | nz > nx = ny | 137 | −68.5 | Parallel | nz = nx > ny | 0.16 |
| 2 | 200 | 0 | −130 | — | nz > nx = ny | 137 | −68.5 | Parallel | nz = nx > ny | 0.04 |
| 3 | 200 | 0 | −110 | — | nz > nx = ny | 137 | −68.5 | Parallel | nz = nx > ny | 0.01 |
| 4 | 200 | 0 | −90 | — | nz > nx = ny | 137 | −68.5 | Parallel | nz = nx > ny | 0.08 |
| 5 | 200 | 0 | −70 | — | nz > nx = ny | 137 | −68.5 | Parallel | nz = nx > ny | 0.23 |
| 6 | 200 | 0 | −310 | — | nz > nx = ny | 137 | 68.5 | Orthogonal | nx > ny = nz | 0.05 |
| 7 | 200 | 0 | −290 | — | nz > nx = ny | 137 | 68.5 | Orthogonal | nx > ny = nz | 0.00 |
| 8 | 200 | 0 | −270 | — | nz > nx = ny | 137 | 68.5 | Orthogonal | nx > ny = nz | 0.05 |
| 9 | 200 | 0 | −250 | — | nz > nx = ny | 137 | 68.5 | Orthogonal | nx > ny = nz | 0.21 |
| 10 | 200 | 0 | −220 | — | nz > nx = ny | 300 | 0 | Orthogonal | nz = nx > ny | 0.13 |
| 11 | 200 | 0 | −200 | — | nz > nx = ny | 300 | 0 | Orthogonal | nz = nx > ny | 0.02 |
| 12 | 200 | 0 | −180 | — | nz > nx = ny | 300 | 0 | Orthogonal | nz = nx > ny | 0.01 |
| 13 | 200 | 0 | −160 | — | nz > nx = ny | 300 | 0 | Orthogonal | nz = nx > ny | 0.11 |
| 14 | 200 | 137 | −180 | Parallel | nz > nx > ny | | | None | | 0.65 |

\* The expression "slow axis disposition" refers to a relative relationship between a slow axis of a phase difference layer and an absorption axis of a polarizer of a polarizing plate on a viewing side. In a case where there was no in-plane phase difference (nx = ny), an axis was not able to be defined in the plane, and thus "—" is indicated.

In an actual liquid crystal display device, design considering a tint based on the refractive index wavelength dispersion of a color filter or a phase difference layer is preferably performed. However, generally, it is known that, as the absolute value of the phase difference of each phase difference plate in the optical compensation method is smaller, tint design can be performed in a satisfactory manner. Therefore, a configuration including a phase difference layer of nz≥nx>ny, particularly, a configuration in which a phase difference layer of nz≥nx>ny is disposed such that the slow axis is parallel to an absorption axis of the polarizer of the viewing-side polarizing plate is particularly suitable since phase difference per one sheet is the smallest. The configuration having a phase difference layer of nz>nx>ny has to be optimized with tint design and light leak. However, due to the simple configuration in which there is one phase difference layer, compared with a case where optical compensation is not performed, light leak can be meaningfully improved, and thus the configuration can be suitably used.

Subsequently, calculation results in which phase differences of the phase difference layer A and phase difference layer B disposed as above in a protective film (optical compensation film) that became a liquid crystal cell side with respect to the polarizer in the polarizing plate on the viewing side were adjusted by changing Rth (550) of the liquid crystal cell substrate on the viewing side to 200 nm to 50 nm are provided in Table 2.

TABLE 2

| Compensation configuration | Substrate Rth | Phase difference layer A | | | Slow axis disposition | Anisotropic | Phase difference layer B | | Slow axis disposition | Anisotropic | Relative light leak amount |
|---|---|---|---|---|---|---|---|---|---|---|---|
| | | Re | Rth | | | | Re | Rth | | | |
| 15 | 150 | 0 | −60 | — | nz > nx = ny | 137 | −68.5 | Parallel | nz = nx > ny | 0.00 |
| 16 | 130 | 0 | −40 | — | nz > nx = ny | 137 | −68.5 | Parallel | nz = nx > ny | 0 00 |
| 17 | 100 | 0 | −10 | — | nz > nx = ny | 137 | −68.5 | Parallel | nz = nx > ny | 0.00 |
| 18 | 90 | | | None | | 137 | −68.5 | Parallel | nz = nx > ny | 0.00 |
| 19 | 70 | 0 | 20 | — | nx = ny > nz | 137 | −68.5 | Parallel | nz = nx > ny | 0.00 |
| 20 | 50 | 0 | 40 | — | nx = ny > nz | 137 | −68.5 | Parallel | nz = nx > ny | 0.00 |
| 21 | 150 | 137 | −122 | Parallel | nz > nx > ny | | | None | | 0.21 |
| 22 | 130 | 137 | −100 | Parallel | nz > nx > ny | | | None | | 0.10 |
| 23 | 100 | 137 | −80 | Parallel | nz > nx > ny | | | None | | 0.01 |
| 17 | 100 | 0 | −190 | — | nz > nx = ny | 137 | 68.5 | Orthogonal | nx > ny = nz | 0.00 |
| 18 | 80 | 0 | −170 | — | nz > nx = ny | 137 | 68.5 | Orthogonal | nx > ny = nz | 0.00 |
| 19 | 50 | 0 | −140 | — | nz > nx = ny | 137 | 68.5 | Orthogonal | nx > ny = nz | 0.00 |
| 20 | 100 | 0 | −100 | — | nz > nx = ny | 300 | 0 | Orthogonal | nz = nx > ny | 0.02 |
| 21 | 80 | 0 | −80 | — | nz > nx = ny | 300 | 0 | Orthogonal | nz = nx > ny | 0.02 |
| 22 | 50 | 0 | −50 | — | nz > nx = ny | 300 | 0 | Orthogonal | nz = nx > ny | 0.02 |

Various optical compensation methods presented in Tables 1 and 2 are clearly optical compensation methods having excellent display properties at black display and can be suitably used.

Among these, in the configuration presented in Table 2, in which the phase difference layer A satisfied nz>nx=ny and the phase difference layer B satisfied nz=nx>ny, as the Rth value of the substrate becomes smaller, the phase difference value of the phase difference layer A may be reduced. In a case where the Rth value of the substrate is 90 nm, the optical film A is not required. This configuration is particularly preferably since only one phase difference layer is required, and a phase difference per one layer has to be small.

<Implementation Evaluation>

Subsequently, a liquid crystal display device was manufactured and evaluated.

[Production of Polymer] (Synthesis of Di-tert-Butyl Fumarate)

60 mL of ethylene glycol dimethyl ether, 20 g of maleic acid, and 4 g of sulfuric acid were introduced to a 300 mL autoclave equipped with a stirrer and a thermometer, 51 g of 2-methylpropylene was injected, and reaction was performed at 40° C. for two hours under stirring. 80 mL of ethylene glycol dimethyl ether solution of di-tert-butyl maleate obtained by neutralizing and washing the reaction solution obtained by the above reaction and 0.3 g of piperidine were introduced to a 150 mL flask equipped with a stirrer, a cooler, and a thermometer, and reaction was performed at 110° C. for two hours under stirring. GC analysis was performed on the obtained reaction solution, and, as a result, the isomerization ratio to di-tert-butyl fumarate was 99%. After the solvent of the obtained reaction solution was distilled, sublimation was performed, to obtain 22 g of di-tert-butyl fumarate having a purity of 99%. Thereafter, the synthesis as above was repeated 5 times to obtain 110 g of di-tert-butyl fumarate having a purity of 99%.

(Synthesis of Fumaric Acid Diester Polymer 1)

50 g (0.25 mol) of diisopropyl fumarate, 1.9 g (0.008 mol) of di-tert-butyl fumarate obtained in the above synthesis, 2.8 g (0.016 mol) of diethyl fumarate, and 0.24 g (0.0014 mol) of tertiary butyl peroxypivalate which was a polymerization initiator were put into a glass ampule with a capacity of 75 mL, nitrogen replacement and depressurization were repeated, and sealing was performed under reduced pressure. The ampoule was put into a constant-temperature tank at 50° C. and kept for 48 hours to perform radical polymerization. After completion of the polymerization reaction, the polymerized product was taken out from the ampule and dissolved with 400 g of tetrahydrofuran. This polymer solution was added dropwise to 3 L of methanol to be precipitated and was vacuum dried at 80° C. for 10 hours to obtain 48 g of a fumaric acid diester-based resin. The number-average molecular weight of the obtained fumaric acid diester-based resin was 150,000. It was confirmed by 1H-NMR measurement that the resin composition was diisopropyl fumarate residue unit/di-tert-butyl fumarate residue unit/diethyl fumarate residue unit=93/3/4.

(Synthesis of Fumaric Acid Diester Polymer 2)

18 kg of distilled water including 0.2 mass % of partially saponified polyvinyl alcohol, 3 kg of diisopropyl fumarate, and 7 g of dimethyl-2,2'-azobisisobutyrate as a polymerization initiator were introduced to a 30 liter autoclave, and suspension radical polymerization reaction was performed under conditions of polymerization temperature of 50° C. and polymerization time of 24 hours. The obtained particles were filtrated, thoroughly washed with methanol, and dried at 80° C., so as to obtain a diisopropyl fumarate homopolymer. A number-average molecular weight of the obtained diisopropyl fumarate homopolymer was 160,000.

[Production of Phase Difference Film]

(Production of Polystyrene Film 1)

1 part by mass of citric acid glyceride (POEM K-37V (product name) that was able to be obtained from Riken Vitamin Co., Ltd.) was added with respect to 100 parts by mass of the polystyrene resin "G9504" that was able to be obtained from PS Japan Corporation and dissolved in dichloromethane at a concentration of solid content of 20 mass % to prepare a dope. A dope pressurized and filtrated with a sintered metal filter having an average pore size of 10 μm was cast on an endless metal belt and dried by drying air, to form a film on an endless metal belt, the film was peeled off, the solvent was completely removed by drying with a zone dryer, the film was wound up, and biaxial stretching was sequentially performed by using roll stretching (longitudinal stretching) and tenter stretching (cross-direction stretching), so as to obtain a stretched polystyrene film 1. The film thickness after biaxial stretching was 20 µm, and the residual solvent amount was less than 0.1 mass % (the detection limit or less) with respect to the dry film mass (measured by gas chromatograph).

(Production of Polystyrene Film 2)

A polystyrene film 2 was obtained in the same manner as the polystyrene film 1 except for adjusting the dope flow rate at casting such that the film thickness after biaxial stretching was 15 µm. The residual solvent amount was less than 0.1 mass % (the detection limit or less) with respect to a dry film mass (measured by gas chromatograph).

(Production of Styrene-maleic Acid Anhydride Copolymer Film 1)

A styrene-maleic acid anhydride copolymer film 1 was obtained in the same manner as in the polystyrene film 1 xcept for using a styrene-maleic acid anhydride copolymer "D332" (product name) that was able to be obtained from NOVA Chemicals Corporation. The film thickness was 20 µm, and the residual solvent amount was less than 0.1 mass % (the detection limit or less) with respect to a dry film mass (measured by gas chromatograph).

(Production of Styrene-maleic Acid Anhydride Copolymer Film 2)

A styrene-maleic acid anhydride copolymer film 2 was manufactured in the same manner as in the styrene-maleic acid anhydride copolymer film 1 except for causing the film thickness to be 12 µm. The residual solvent amount was less than 0.1 mass % (the detection limit or less) with respect to a dry film mass (measured by gas chromatograph).

(Production of Aromatic Cellulose Acylate Film 1)

An aromatic cellulose acylate film 1 was obtained in the same manner as in the polystyrene film 1 except for using aromatic cellulose acylate synthesized in the method disclosed in JP2006-241433A. The film thickness was 12 µm and the residual solvent amount was 0.2 mass % with respect to a dry film mass (measured by gas chromatograph).

(Production of Fumaric Acid Diester Film 1)

The fumaric acid diester polymer 1 that was able to be obtained by the above synthesis was dissolved in methyl isobutyl ketone to obtain 15 mass % of a resin solution, casting was performed on a polyethylene terephthalate film with a coater, drying was performed at 100° C. for 10 minutes, a polyethylene terephthalate film was removed to obtain a fumaric acid diester polymer film 1 having a thickness of 14 µm. The film thickness was 12 µm, and the residual solvent amount was less than 0.1 mass % (the detection limit or less) with respect to a dry film mass (measured by gas chromatograph).

(Production of Fumaric Acid Diester Polymer Film 2)

A fumaric acid diester film 2 was obtained in the same manner as in the fumaric acid diester film 1 except for not performing filtration. The residual solvent amount was less than 0.1 mass % (the detection limit or less) with respect to a dry film mass (measured by gas chromatograph).

(Production of Fumaric Acid Diester Polymer Film 3)

A fumaric acid diester film 3 was obtained in the same manner as in the fumaric acid diester film 1 except for adding a methyl isobutyl ketone dispersion liquid of fumed silica particles (AEROSIL (product name) available from Nippon Aerosil Co., Ltd.) of 0.002 mass % expressed in terms of solid contents with respect to the mass of the solid content of the dope to the dope after filtration. The residual solvent amount was less than 0.1 mass % (the detection limit or less) with respect to a dry film mass (measured by gas chromatograph).

(Production of Fluorinated Polystyrene Film 1)

A poly($\alpha,\beta,\beta$-trifluorostyrene) (PTFS) polymer was dissolved in dichloromethane at a concentration of 5 mass % to manufacture a dope. The dope pressurized and filtrated with a sintered metal filter with an average pore diameter of 10 µm was cast on a flat glass substrate using an applicator, was dried in a local exhaust environment for 24 hours, and was placed in a vacuum oven at room temperature for eight hours. After drying, the film was peeled off from the flat glass substrate to obtain a fluorinated polystyrene film 1. The film thickness was 5 µm, and the residual solvent amount was less than 0.1 mass % (the detection limit or less) with respect to a dry film mass (measured by gas chromatograph).

(Production of Fluorinated Polystyrene Film 2)

A fluorinated polystyrene film 2 was obtained in the same manner as in the fluorinated polystyrene film 1 except for causing the dry film thickness to be 15 µm. The residual solvent amount was less than 0.1 mass % (the detection limit or less) with respect to a dry film mass (measured by gas chromatograph).

(Film 1 Having Vertically Aligned Rod-like Liquid Crystal Alignment Fixed Layer)

EXPOA-018 which was one of inorganic vertical alignment films was dissolved in an ethanol/butyl cellosolve-based solvent at a concentration of 4% on a ZEONOR film "ZF14" that can be obtained from Zeon Corporation, filtration was performed through a membrane filter (average pore diameter 0.6 µm), coating was performed in a die head coating method (film thickness: 100 nm), and drying was performed at a drying temperature of 120° C., for five minutes to prepare a vertical alignment film.

The obtained film with vertical alignment film was subjected to a rubbing treatment, an ink obtained by dissolving the following mixture of the compound (1), RM (1) and RM (3) disclosed in JP2010-522892A in a formulation ratio of 5:3:2 in a mixed solvent of toluene/cyclohexanone of 7:3 and adjusting a concentration of solid content to be 21.5% was filtrated with a membrane filter (average pore diameter of 1.0 µm), the flow rate was adjusted at coating such that the thickness phase difference Rth (550) at the measurement wavelength of 550 nm was −80 nm, and the coating was performed by a die head coating method. Thereafter, drying was performed at a drying temperature of 65° C. for five minutes, and fixation was performed by curing by irradiation with ultraviolet rays such that an irradiation dose was 380 mJ/cm$^2$, so as to manufacture a film 1 having a vertically aligned rod-like liquid crystal alignment fixed layer.

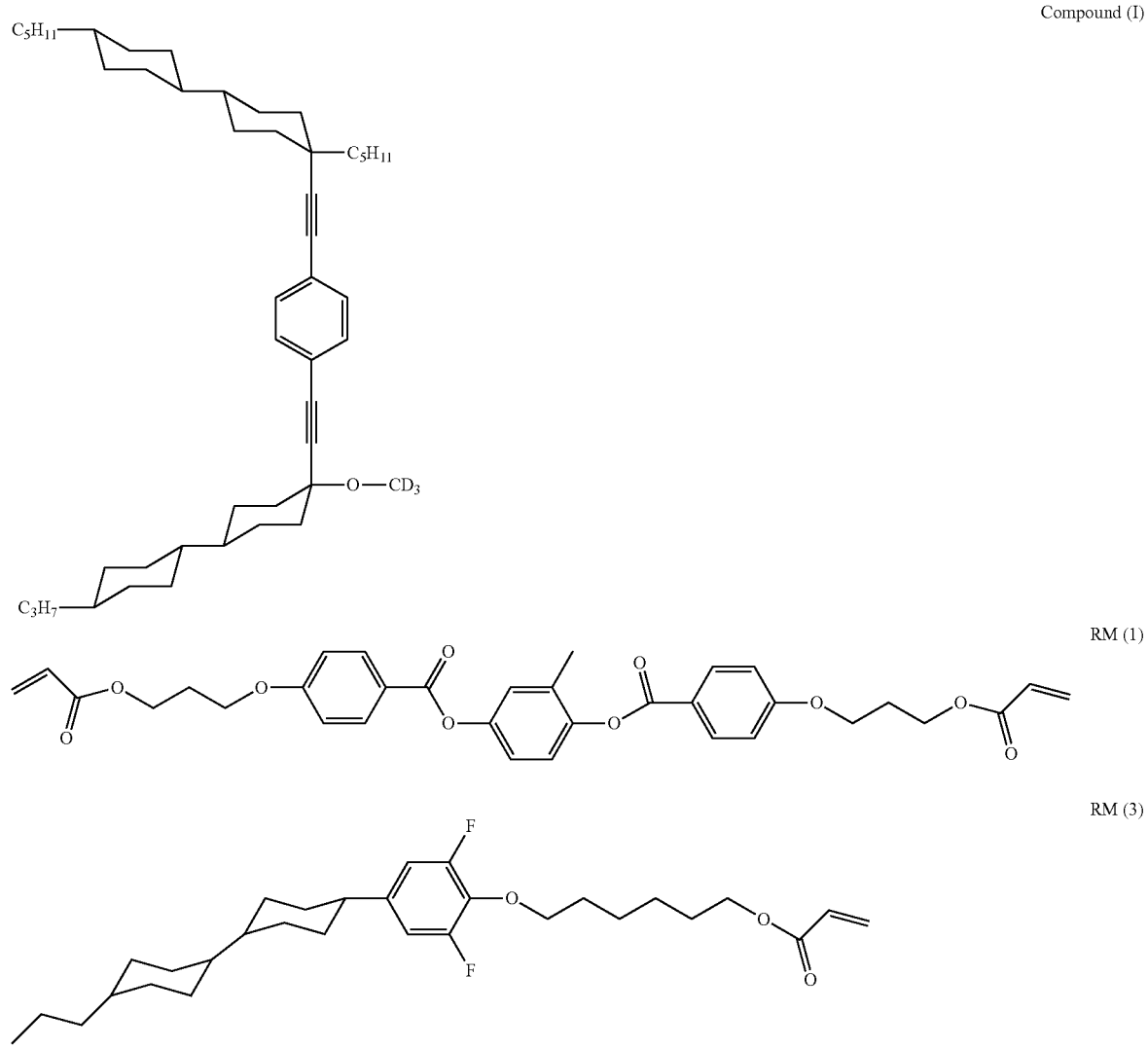

(Film 2 Having Vertically Aligned Rod-like Liquid Crystal Alignment Fixed Layer)

A film 2 having a vertically aligned rod-like liquid crystal alignment fixed layer was manufactured in the same manner as in the manufacturing of the film 1 having a vertically aligned rod-like liquid crystal alignment fixed layer except for using a triacetyl cellulose film (FUJITAC T-40 that was able to be obtained from Fujifilm Corporation), instead of ZEONOR film "ZF14".

(Production of Stretched Styrene-maleic Acid Anhydride Copolymer Film 3)

A styrene-maleic acid anhydride copolymer film 1 was obtained in the same manner as in the polystyrene film 1 except for using a styrene-maleic acid anhydride copolymer "D332" (product name) that was able to be obtained from NOVA Chemicals Corporation. The obtained film was subjected to free end uniaxial stretching by 1.5 times at 130° C. by a roll stretching machine to obtain a stretched styrene-maleic acid anhydride copolymer film 3. The film thickness after stretching was 30 µm, and the residual solvent amount was less than 0.1 mass % (the detection limit or less) with respect to a dry film mass (measured by gas chromatograph).

(Production of Stretched Styrene-maleic Acid Anhydride Copolymer Film 4)

A stretched styrene-maleic acid anhydride copolymer film 4 was manufactured in the same manner as in the stretched styrene-maleic acid anhydride copolymer film 3 except for performing casting without filtering the dope. The residual solvent amount was less than 0.1 mass % (the detection limit or less) with respect to a dry film mass (measured by gas chromatograph).

(Production of Stretched Styrene-maleic Acid Anhydride Copolymer Film 5)

A stretched styrene-maleic acid anhydride copolymer film 5 was manufactured in the same manner as in the stretched styrene-maleic acid anhydride copolymer film 3 except for adding a dichloromethane dispersion liquid of fumed silica particles (AEROSIL (product name) available from Nippon Aerosil Co., Ltd.) of 0.002 mass % expressed in terms of solid contents with respect to the solid content of the dope to the dope in advance. The residual solvent amount was less than 0.1 mass % (the detection limit or less) with respect to a dry film mass (measured by gas chromatograph).

(Film 1 Having Vertically Aligned Discotic Liquid Crystal Fixed Layer)

—Formation of Optically Anisotropic Layer Including Liquid Crystal Compound—

—Alkali Saponification Treatment—

A cellulose acetate film (FUJITAC T-40 that was able to be obtained from Fujifilm Corporation) was passed through a dielectric-type heating roll at a temperature of 60° C., the film surface temperature was raised to 40° C., and one side of the film was coated with an alkaline solution in the composition provided as below at a coating amount of 14 ml/m² by using a bar coater and was transferred to a steam-type far infrared heater manufactured by Noritake Co., Ltd. heated to 110° C. for 10 seconds. Subsequently, pure water was applied at 3 ml/m² by using a bar coater in the same manner. Subsequently, washing with water using a fountain coater and dewatering using an air knife were repeated three times, transportation to a drying zone at 70° C. was performed for 10 seconds, and drying was performed, so as to prepare an alkali saponified cellulose acetate film subjected to the alkali saponification treatment.

| Composition of alkali solution | |
|---|---|
| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 parts by mass |
| Propylene glycol | 14.8 parts by mass |

—Formation of Alignment Film—

An alignment film coating solution in the following composition was filtrated through a membrane filter (average pore size 0.6 m) and was continuously applied to a long cellulose acetate film subjected to a saponification treatment with a #14 wire bar. Drying was performed with hot air of 60° C. for 60 seconds and further with hot air of 100° C. for 120 seconds.

| Composition of alignment film coating solution | |
|---|---|
| Modified polyvinyl alcohol below | 10 parts by mass |
| Water | 371 parts by mass |
| Methanol | 119 parts by mass |
| Glutaraldehyde | 0.5 parts by mass |
| Photopolymerization initiator (IRGACURE 2959, manufactured by BASF SE) | 0.3 parts by mass |

Modified polyvinyl alcohol (In the structural formula below, numerical values are molar ratios.)

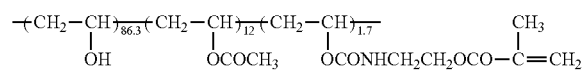

—Formation of Optically Anisotropic Layer Including Discotic Liquid Crystal Compound—

The prepared alignment film was continuously subjected to a rubbing treatment. At this point, the longitudinal direction and the transport direction of the long film were parallel to each other, and the rotation axis of a rubbing roller was orthogonal to the longitudinal direction of the film.

The optically anisotropic layer coating solution A including a discotic liquid crystal compound described below was filtrated through a membrane filter (average pore size 1.0 Gm) and was continuously applied to the manufactured alignment film with a #2.7 wire bar. The conveying speed (V) of the film was 36 m/min. In order to dry of the solvent of the coating solution and ripen alignment of the discotic liquid crystal compound, heating was performed for 90 seconds with warm air at 80° C. Subsequently, the alignment of the liquid crystal compound was fixed by performing UV irradiation at 80° C., and an optically anisotropic layer was formed, so as to obtain a film 1 having a vertically aligned discotic liquid crystal fixed layer. The film thickness of the optically anisotropic layer of the film 1 having the vertically aligned discotic liquid crystal fixed layer was 1.0 μm.

| Composition of optically anisotropic layer coating solution (A) | |
|---|---|
| Discotic liquid crystal compound below | 100 parts by mass |
| Photopolymerization initiator (IRGACURE 907, manufactured by BASF SE) | 3 parts by mass |
| Sensitizer (KAYACURE DETX, manufactured by Nippon Kayaku Co., Ltd.) | 1 part by mass |
| Compound 4 (pyridinium salt) | 1 part by mass |
| Fluorinated polymer (FP1) | 0.4 parts by mass |
| Methyl ethyl ketone | 252 parts by mass |

Discotic Liquid Crystal Compound

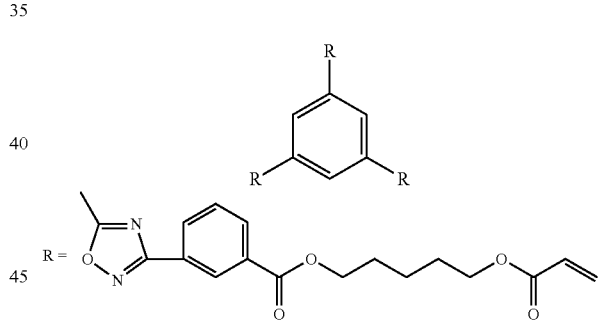

Compound 4 (In the structural formula, a mixture of two kinds of compounds having different substitution positions of a methyl group in a trimethyl-substituted benzene ring. A mixture ratio of the two kinds of compounds 50:50 (mass ratio))

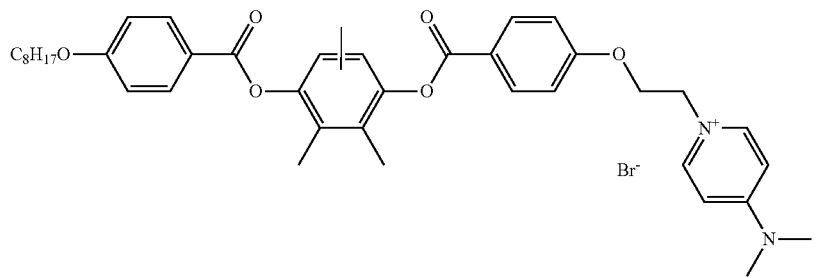

Fluorine-based polymer (FP1)

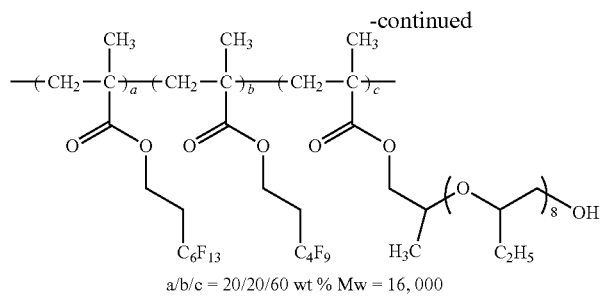

a/b/c = 20/20/60 wt % Mw = 16,000

(Production of Stretched Fumaric Acid Diester Polymer Film 2)

The fumaric acid diester polymer 2 synthesized above was dissolved in a THF solution to obtain a 22% solution, was pressurized and filtrated with a sintered metal filter having an average pore size of 10 μm, was cast on a supporting substrate of a solution casting device by a T-die method, and was dried at 40° C., 80° C., and 120° C. respectively for 10 minutes, so to obtain a film. The film thickness was 60 μm, and the residual solvent amount was less than 0.1 mass % (the detection limit or less) with respect to a dry film mass (measured by gas chromatograph). The obtained film was subjected to free width uniaxial stretching by a roll stretching device in the conditions of a temperature of 140° C. and a stretching speed of 10 mm/min and was stretched 1.2 times, so as to obtain a stretched fumaric acid diester polymer film 2.

(Production of Alicyclic Polyolefin Film 1)

An alicyclic polyolefin ARTON G7810 (product name) that was able to be obtained from JSR Corporation was dissolved in dichloromethane to obtain a 20% solution, was pressurized and filtrated with a sintered metal filter having an average pore size of 10 μm, was cast on a supporting substrate of a solution casting device by a T-die method, was dried at 40° C., 80° C., and 120° C. respectively for 10 minutes, so to obtain a film. The film thickness was 30 μm, and the residual solvent amount was less than 0.1 mass % (the detection limit or less) with respect to a dry film mass (measured by gas chromatograph).

(Measuring of Phase Difference of Phase Difference Film)

Each phase difference value of each phase difference film obtained above was measured at a wavelength of 550 nm in KOBRA 21ADH (manufactured by Oji Scientific Instruments). The phase difference values of commercially available films used in comparative examples below were measured in the same manner. The results are provided in Table 4.

(Inside Haze of Phase Difference Film)

Each film of each phase difference film obtained as described above was cut into 40 mm×80 mm, and several droplets of matching oil were added dropwise on both sides thereof and was interposed between two glass plates (MICRO SLIDE GLASS Product number S9213, MATSUNAMI Glass Ind., Ltd.) having a thickness of 1.3 mm. In this state, a value (%) obtained by subtracting a haze measured in a state in which several droplets of matching oil were added dropwise between two sheets of glasses from the haze value measured according to JIS K-6714 using a haze meter "HGM-2DP" (manufactured by Suga Test Instruments Co., Ltd.) at 25° C. and a relative humidity of 60% was set as an inside haze. Inside haze of the commercially available films used in comparative examples below was measured in the same manner. The results are provided in Table 4.

(Evaluation of Other Properties of Phase Difference Film)

Folding endurance, photoelastic coefficient, surface energy, and the number of surface protrusions were evaluated in the order and the standards below. The commercially available films used in comparative examples below were evaluated in the same manner. The results are provided in Table 3.

Folding Endurance

Each phase difference film obtained as described above was cut into 15 mm×130 mm and was preserved for 16 hours under conditions of a temperature of 25° C. and a humidity of 55% RH, folding was repeated at 135° per side at a rate of 175 times per minute with applied load of 4.9 N in the curvature radius of folding of 2.0 mm by a folding endurance testing machine in conformity with JIS-C6471, and brittleness was evaluated in the following standards based on the number of times of folding required for the breaking of the film. The evaluation was performed on five samples which were arbitrarily cut, so as to use the average value of the number of times.

S: 1,000 times or more
A: 500 times to 999 times
B: 100 times to 499 times
C: 50 times to 99 times
D: Less than 49 times Photoelastic Coefficient Each phase difference film obtained as described above was cut into 12 mm×120 mm, a tensile stress is applied to the longitudinal direction, and the retardation at this point was measured with an ellipsometer (M150, JASCO Corporation), so as to calculate a photoelastic coefficient from the amount of change in retardation according to the stress. With respect to the film having in-plane phase difference (Re (550)), the sample was cut out with the slow axis direction thereof aligned with the longitudinal direction of the sample, and the in-plane phase difference was measured.

Surface Energy

Each sample of each retardation film obtained above was preserved for 16 hours under conditions of a temperature of 25° C. and a humidity of 55% RH, the static contact angle of the surface on the side on which the inorganic layer was formed to each was measured by using two kinds of measurement solutions: water and methylene iodide. The surface tensions of water and methylene iodide were plotted on the lateral axis, contact angle values of the respective film samples were plotted on the vertical axis, and a contact angle value in the case of zero surface tension was extrapolated so as to obtain a surface energy on the surface on the side on which the inorganic layer of the film sample was formed. The expression "the surface on the side on which the inorganic layer was formed" means as described in the examples below.

The Number of Surface Protrusions

Surface shape observation at a field of view of 1 mm² on the surface on the side on which the inorganic layer was formed in each production example was performed for 10 fields of view at random positions by using a laser surface measurement device "Micro Map 5000" (product name) that was able to be obtained from OPTONOR AS, and an average number per 1 mm² of convex portions protruding by 1 μm or greater from the average plane in the field of view was calculated.

TABLE 3

| | | Surface energy mN/m | Average number of surface protrusions (protrusions/mm²) | Photoelastic coefficient $10^{-12}$/Pa | Folding endurance |
|---|---|---|---|---|---|
| Polystyrene film 1 | | 33 | 0.2 | 7.8 | D |
| Polystyrene film 2 | | 33 | 0.2 | 7.8 | D |
| Styrene-maleic acid anhydride copolymer film 1 | | 41 | 0.2 | 4.4 | B |
| Styrene-maleic acid anhydride copolymer film 2 | | 41 | 0.2 | 4.4 | B |
| Aromatic cellulose acylate film 1 | | 51 | 0.3 | 18 | A |
| Stretched styrene-maleic acid anhydride copolymer film 3 | | 41 | 0.1 | 4.4 | A |
| Stretched styrene-maleic acid anhydride copolymer film 4 | | 41 | 1.1 | 4.4 | A |
| Stretched styrene-maleic acid anhydride copolymer film 5 | | 41 | 0.8 | 4.4 | A |
| Fluorinated polystyrene film 1 | | 31 | 0.3 | 12 | C |
| Fluorinated polystyrene film 2 | | 31 | 0.3 | 12 | C |
| Fumaric acid diester polymer film 1 | | 43 | 0.2 | −8 | A |
| Fumaric acid diester polymer film 2 | | 43 | 1.2 | −8 | A |
| Fumaric acid diester polymer film 3 | | 43 | 0.8 | −8 | A |
| Stretched fumaric acid diester polymer film 4 | | 43 | 0.2 | −8 | A |
| Alicyclic polyolefin film 1 | | 42 | 0.4 | 6.2 | B |
| PC film disclosed in JP2013-100528A | | 39 | 1.5 | 29 | B |
| Film disclosed in Production Example 4 of JP2007-65575A | | 40 | 0.6 | 7.1 | B |
| Film 1 having vertically aligned rod-like liquid crystal alignment fixed layer | Optically anisotropic layer side | 45 | 0.8 | — | B |
| | Substrate side | 34 | 1.8 | | |
| Film 2 having vertically aligned rod-like liquid crystal alignment fixed layer | Optically anisotropic layer side | 39 | 0.4 | — | A |
| | Substrate side | 58 | 1.2 | | |
| Film 1 having vertically aligned discotic liquid crystal fixed layer | Optically anisotropic layer side | 42 | 0.7 | — | A |
| | Substrate side | 58 | 1.2 | | |
| Coated polystyrene film 1 | Coated surface | 45 | 0.2 | 7.4 | C |
| | Uncoated surface | 33 | 1.8 | | |
| Polyethylene terephthalate film | | 43 | 0.3 | — | S |
| Cycloolefin film | | 34 | 1.8 | — | B |

[Manufacturing of Laminated Film]

Laminated films to be used in the configuration of liquid crystal display devices of Examples 1 to 20 and Comparative Examples 1 to 4 were manufactured by using any one of phase difference films manufactured above and commercially available films. In the manufacturing of each of the laminated films, formation and adhesion of the inorganic layers were performed as follows.

(Formation of Inorganic Layers)

An inorganic layer (silicon nitride (SiN) layer) was formed on the surface of an organic layer on the surface of a film to which the inorganic layer was applied, by using a CVD device, so as to form. In the formation of the inorganic layer, as raw material gases, silane gas (flow rate 160 sccm: 0° C., Standard state of one atmospheric pressure, the same is applied below), ammonia gas (flow rate: 370 sccm), hydrogen gas (flow rate: 590 sccm), and nitrogen gas (flow rate: 240 sccm) were used. As a power source, a SiN layer was formed using a high-frequency power source with a frequency of 13.56 MHz. The film forming pressure was 40 Pa, and the film thickness reached was 50 nm.

(Preparation of Adhesive Solution 1)

N-2-(aminoethyl)-3-aminopropyltriethoxysilane (product name "KBM-603" that was able to be obtained from Shin-Etsu Chemical Co., Ltd.) and 3-glycidoxypropyltrimethoxysilane (product name "KBM-403" that was able to be obtained from Shin-Etsu Chemical Co., Ltd.) were added to isopropanol at a mass ratio of 10:90 (molar ratio of 11:89), so as to prepare an adhesive solution having a silane coupling agent concentration (total) of 0.5%. The obtained adhesive solution 1 was filtrated with a membrane filter (average pore size 0.2 μm).

(Adhesion of Film)

One side of the film to be bonded was coated with the prepared adhesive solution 1 with a die coater and the prepared adhesive solution 1 was dried at 50° C. for three minutes, the other film was laminated by using a roll laminator, drying was performed at 50° C. for five minutes, the adhesive layer was cured, and two films were adhered.

Example 1

An inorganic layer was formed on the surface of the stretched styrene-maleic acid anhydride copolymer film 3 opposite to the side in contact with the endless metal belt. The polystyrene film 1 was coated with the adhesive solution 1. The inorganic layer side of the stretched styrene-maleic acid anhydride copolymer film 2 on which the inorganic layer was formed was adhered as a bonding surface, so as to manufacture a laminate film for Example 1.

Example 2

A laminated film for Example 2 was obtained in the same manner as in Example 1 except for using the polystyrene film 2 instead of the polystyrene film 1.

Example 3

An inorganic layer was formed on the surface of the stretched styrene-maleic acid anhydride copolymer film 3 opposite to the side which was in contact with the endless metal belt, and this was used as a laminated film for Example 3.

Example 4

A laminated film for Example 4 was obtained in the same manner as in Example 1 except for using the alicyclic polyolefin film 1 instead of the polystyrene film 1.

Example 5

An inorganic layer was formed on the surface of the styrene-maleic acid anhydride copolymer film 1 opposite to the side in contact with the endless metal belt. The inorganic layer was further coated with the adhesive solution 1, the film 1 side for a liquid crystal fixed layer having the vertically aligned discotic liquid crystal fixed layer was adhered as a bonding surface, so as to obtain a laminate film for Example 5.

Example 6

A laminated film for Example 6 was obtained in the same manner as in Example 5 except for using the styrene-maleic acid anhydride copolymer film 2 instead of the styrene-maleic acid anhydride copolymer film 1.

Example 7

A laminated film for Example 7 was obtained in the same manner as in Example 6 except for using the film 2 having a vertically aligned discotic liquid crystal fixed layer instead of the film 1 having a vertically aligned discotic liquid crystal fixed layer.

Example 8

A laminated film for Example 8 was obtained by forming an inorganic layer on the surface of the liquid crystal alignment fixing layer of the film 1 having the vertically aligned discotic liquid crystal fixed layer.

Example 9

A laminated film for Example 9 was obtained in the same manner as in Example 1 except for using the fluorinated polystyrene film 2 instead of the polystyrene film 1.

Example 10

A laminated film for Example 10 was obtained in the same manner as in Example 1 except for adhering the film 1 having a vertical alignment liquid crystal alignment fixed layer by using ZEONOR ZF14 side as a bonding surface, instead of the polystyrene film 1.

Example 11

An inorganic layer was formed on the surface of the polycarbonate film disclosed in Example 8 of JP2013-100528A on the opposite side to the side in contact with the chill roll, and the fluorinated polystyrene film 2 was adhered such that the inorganic layer surface on the polycarbonate and the fluorinated polystyrene film 2 were bonded to each other, so as to obtain a laminated film for Example 11.

Example 12

A laminated film for Example 12 was obtained in the same manner (the deposition surface of the inorganic layer was the side in contact with the PET film) as in Example 10 except for using a polymer film disclosed in Production Example 4 of JP2007-65575A instead of the polycarbonate film.

Example 13

An inorganic layer was formed on the surface of the stretched fumaric acid diester polymer film 2 on the side which was in contact with the supporting base material and this was used as a laminated film for Example 13.

Example 14

A laminated film for Example 14 was obtained in the same manner as in Example 2 except using the fumaric acid diester polymer film 1 instead of the polystyrene film 2.

Example 15

A laminated film for Example 15 was obtained in the same manner as in Example 14 except for using the stretched styrene-maleic acid copolymer film 4 instead of the stretched styrene-maleic acid copolymer film 3.

Example 16

A laminated film for Example 16 was obtained in the same manner as in Example 14 except for using the stretched styrene-maleic acid copolymer film 5 instead of the stretched styrene-maleic acid copolymer film 3.

Example 17

An inorganic layer was formed on the surface of the aromatic cellulose acylate film 1 on the side which was in contact with the endless metal belt. The surface of the inorganic layer and the surface of the film 1 having a vertical discotic liquid crystal alignment fixed layer were adhered to each other, to obtain a laminated film for Example 17.

Example 18

An inorganic layer was laminated on the surface of the fumaric acid diester polymer film 1 opposite to the side in contact with the polyethylene terephthalate film. The surface on the inorganic layer side and the liquid crystal alignment fixing layer side of the film 1 having the vertical discotic liquid crystal alignment fixed layer were adhered to each other and laminated to obtain a laminated film for Example 18.

Example 19

A laminated film for Example 19 was obtained in the same manner as in Example 18 except for using the fumaric acid diester polymer film 2 instead of the fumaric acid diester polymer film 1.

Example 20

A laminated film for Example 20 was obtained in the same manner as in Example 18 except for using the fumaric acid diester polymer film 3 instead of the fumaric acid diester polymer film 1.

Comparative Example 1

A laminated film for Comparative Example 1 was obtained in the same manner as in Example 1 except for not providing an inorganic layer on the film.

Comparative Example 2

A laminated film for Comparative Example 2 was obtained in the same manner as in Example 3 except for not providing an inorganic layer on the film.

Comparative Example 3

An inorganic layer was formed on the surface of a cycloolefin polymer film (product name: ZEONOR ZF14) that was able to be obtained from Zeon Corporation, and this was used as a laminated film for Comparative Example 3.

Comparative Example 4

An inorganic layer was formed on the surface of a polyethylene terephthalate film (product name: COSMOS-HINE A4300) that was able to be obtained from Toyobo Co., Ltd. in the method described above, and this was used as a laminated film for Comparative Example 4.

[Manufacturing of Polarizing Plate]

As a polarizer, a polyvinyl alcohol-based polarizing film (thickness: 8 μm) dyed with iodine was prepared. A triacetyl cellulose film (FUJITAC T-40 that was able to be obtained from Fujifilm Corporation) was bonded to one surface of the polarizer with a PVA adhesive.

On the other surface of the polarizer, each laminated film prepared above was placed so that the film 2 presented in Table 4 was on the side of the polarizer so that the films were arranged as presented in Table 1, and the films were bonded by using a UV adhesive, so as to manufacture each polarizing plate. In case of bonding, the in-plane slow axis of the laminated film and the absorption axis of the polarizing film were prepared so as to have the relationship as presented in Table 4. SK-DYNE, an optical pressure sensitive adhesive that was able to be obtained from Soken Chemical & Engineering Co., Ltd., was transferred and formed on the surface of the laminated film opposite to the polarizer, so as to obtain polarizing plates with adhesive layers used in the configuration of the liquid crystal display devices of Examples 1 to 20 and Comparative Examples 1 to 4.

(Cuttability Evaluation of Polarizing Plate)

The obtained polarizing plate was fixed on a rubber-based cutting board, the blade was maintained to be in contact with the polarizing plate at an angle of 45° using an NT cutter (A-300 (product name) that was able to be obtained from NT Incorporated), and the blade was dragged at a at a speed of 5 cm/sec, so as to cut the polarizing plate. The cut surface of the laminated film portion was observed with an optical microscope and was evaluated as follows. The results are presented in Table 4.

A: The cut surface is smooth, cracks were not recognized.

B: Cracks were generated at a depth of less than 0.1 mm from the cut surface to the inside of the film.

C: Cracks were generated at a depth of 0.1 mm or greater from the cut surface to the inside of the film.

[Production of Liquid Crystal Display Device to be Standard]

A liquid crystal panel was taken out from the iPad2 [manufactured by Apple Inc.] equipped with the IPS mode liquid crystal cell, only the viewing side (upper side) of the optical film arranged above and below the liquid crystal cell was removed, the front glass surface of the liquid crystal cell was washed.

A polarizing plate obtained by bonding a ZEONOR film (ZFI4), a PVA polarizer, a triacetyl cellulose film (FUJITAC T-40 that was able to be obtained from Fujifilm Corporation) sequentially from the cell side was adhered was bonded to the front glass surface after washing, with a pressure sensitive adhesive. The absorption axis of this polarizing plate was disposed so as to be in a crossed nicols relationship with the absorption axis of the polarizing plate on the backlight side (lower side). In this manner, an IPS mode liquid crystal display device to be a standard was manufactured.

[Liquid Crystal Display Devices of Examples 1 to 20 and Comparative Examples 1 to 4]

In accordance with the description of WO2013/080495, an IPS liquid crystal cell was manufactured using a glass substrate on a backlight side and a polyimide substrate on a viewing side. As a polyimide substrate, as presented in Table 4, polyimide varnishes having different Rth were used. The liquid crystal cell was set to the same size as the liquid crystal cell of iPad2 [manufactured by Apple Inc.], a pressure sensitive adhesive is re-applied to the polarizing plate peeled off from the backlight side of the iPad2 on the backlight side of the obtained single-sided resin substrate liquid crystal cell, and the polarizing plate with the adhesive layer prepared above was bonded to the adhesive layer, on the front side, so as to manufacture IPS mode liquid crystal display devices of Examples 1 to 20 and Comparative Examples 1 to 4.

[Evaluation]

(Oblique Direction Light Leak Evaluation)

Backlight was installed to each of the IPS mode liquid crystal display devices manufactured above, the brightness in a case of black display was measured in a dark room using a measuring machine (EZ-Contrast XL88, manufactured by ELDIM S.A.), an average value of black brightness values at each point of azimuthal angles of 45°, 135°, 225°, and 315° with respect to a polar angle of 60° was evaluated, and visual evaluation was performed on the liquid crystal display device (double sided glass substrate cell, no retardation compensation) to be a standard. The results are presented in Table 4.

A: Light leak was small, light leak in both front and oblique directions was better than standard.

B: Although light leak was observed, light leak in both the front and oblique directions was better than the standard.

C: Light leak was the same as in the standard in both front and diagonal directions.

D: Light leak was worse than standard in both front and diagonal directions.

(Front Contrast)

The brightness values of black display and white display in the front direction of the liquid crystal display device were measured in a dark room by using a measuring device (BM5A, manufactured by TOPCON Technohouse Corporation), the front contrast (white brightness/black brightness) of each example to the front contrast value of the standard liquid crystal display device (standard) measured under the same backlight brightness condition was evaluated. The results are presented in Table 4.

A: The contrast between white display and black display was significantly improved from the standard.

B: It has the same contrast as the standard.

C: The contrast between white display and black display is inferior to the standard.

(Durability Evaluation)

With respect to each of the IPS mode liquid crystal display devices manufactured above, the end portions were doubly covered with an aluminum vapor deposition tape over the width of 2 mm above and below for protection such that water vapor did not enter from the end portion, 500 hours in a constant temperature and constant humidity bath at 40° C. and 90% had elapsed, the IPS mode liquid crystal display device was taken out, the backlight was set again, white display was operated, and the number of dot omissions on the entire surface of the panel was visually checked. The results are presented in Table 4.

A: Dot omission was less than 5.

B: Dot omission was 5 or greater and less than 10.

C: Dot omission was 10 or greater.

(Adhesion Evaluation)

Only the laminated film was cut out from the adhesive layer side of the polarizing plate with an adhesive layer same as the respective polarizing plates with adhesive layers used for manufacturing the IPS mode liquid crystal display device, and a notch with a length of 1 cm was provided while adjusting the depth of cut so that incisions did not reach the polarizer. The polarizing plate with an adhesive layer was adhered to a glass plate on the surface of the adhesive layer and was closely attached with a rubber roller, the glass plate was fixed, the polarizing plate was dragged vertically to the glass plate in a direction perpendicular to the longitudinal direction of the incision, so as to be peeled off (90° peeling test). The peeled polarizing plate with an adhesive layer was observed visually and with a loupe, so as to determine the state of break. The results are presented in Table 4.

A: Only an adhesive layer was broken, and no damage was observed in a polarizing plate or a laminate film.

B: Break of a laminate film within 1 mm from incision in an orthogonal direction was observed.

C: A laminate film in a length longer than 1 mm from incision in an orthogonal direction was broken.

(Evaluation of Deformation Unevenness)

The front plate was removed from the IPS mode liquid crystal display device manufactured above, a spherical rubber ball having a weight of 500 g and a diameter of 2 cm was placed on the exposed panel in the center of the panel, the liquid crystal display device was horizontally maintained, and light leak occurring near the contact point with the rubber ball was evaluated as follows.

A: Light leakage was not able to be seen anywhere.

B: Light leakage was slightly visible near the contact point.

C: Light leak occurs near the contact point, but it was acceptable.

TABLE 4

| | | Cell Substrate Rth (nm) | Film 1 (cell side) | Re (nm) | Rth (nm) | Inside haze | Film 2 (Polarizer side) | Re (nm) | Rth (nm) | Inside haze | Direction of Slow axis | Cut-tability | Light leak | Con-trast | Dura-bility | Adhe-sive-ness | Defor-mation uneven-ness |
|---|---|---|---|---|---|---|---|---|---|---|---|---|---|---|---|---|---|
| Example | 1 | 190 | Polystyrene film 1 | 0 | −100 | 0.1 | Stretched styrene-maleic acid anhydride copolymer film 3 | 138 | −69 | 0.2 | Parallel | B | A | B | A | A | C |
| | 2 | 150 | Polystyrene film 2 | 0 | −60 | 0.1 | Stretched styrene-maleic acid anhydride copolymer film 3 | 138 | −69 | 0.2 | Parallel | B | A | B | A | A | C |
| | 3 | 90 | Stretched styrene-maleic acid anhdride copolymer film 3 | 138 | −69 | 0.2 | None | | | | Parallel | A | A | A | A | A | B |
| | 4 | 60 | Alicyclic polyolefin film 1 | 1 | 22 | 0.2 | Styrene-maleic acid anhydride copolymer film 3 | 138 | −69 | 0.2 | Parallel | A | A | B | A | A | B |
| | 5 | 190 | Styrene-maleic acid anhdride copolymer film 3 | 0 | −100 | 0.2 | Film 1 having vertically aligned discotic liquid crystal fixed layer | 138 | −69 | 0.3 | Parallel | A | A | B | A | A | B |
| | 6 | 150 | Styrene-maleic acid anhydride copolymer film 4 | 0 | −60 | 0.2 | Film 1 having vertically aligned discotic liquid crystal fixed layer | 138 | −69 | 0.2 | Parallel | A | A | B | A | A | B |
| | 7 | 150 | Styrene-maleic acid anhydride copolymer film 5 | 0 | −60 | 0.2 | Film 2 having vertically aligned discotic liquid crystal fixed layer | 138 | −69 | 0.1 | Parallel | A | A | A | A | A | B |
| | 8 | 90 | Film 1 having vertically aligned discotic liquid crystal fixed layer | 138 | −69 | 0.2 | None | | | | | A | A | A | A | A | A |
| | 9 | 190 | Fluorinated polystyrene film 1 | 0 | −100 | 0.3 | Stretched styrene-maleic acid anhydride copolymer film 3 | 138 | −69 | 0.2 | Parallel | B | A | B | A | A | B |
| | 10 | 190 | Film 1 having vertically aligned rod-like liquid crystal alignment fixed layer | 0 | −100 | 0.2 | Stretched styrene-maleic acid anhydride copolymer film 3 | 138 | −69 | 0.3 | Parallel | A | A | A | A | A | B |
| | 11 | 190 | Fluorinated polystyrene film 2 | 0 | −290 | 0.3 | PC film disclosed in JP2013-10052BA | 139 | 69 | 0.3 | Orthogonal | A | A | B | B | B | C |
| | 12 | 190 | Fluorinated polystyrene film 2 | 0 | −290 | 0.3 | Film disclosed in Production Example 4 of JP2007-65575A | 131 | 70 | 0.3 | Orthogonal | B | B | B | A | B | B |
| | 13 | 190 | Stretched fumaric acid diester polymer film 4 | 137 | −170 | 0.2 | None | | | | Parallel | A | B | A | A | A | B |
| | 14 | 150 | Fumeric acid diester polymer film 1 | 0 | −65 | 0.1 | Stretched styrene-maleic acid anhydride copolymer film 3 | 138 | −69 | 0.2 | Parallel | A | A | B | A | B | A |
| | 15 | 150 | Fumeric acid diester polymer film 1 | 0 | −65 | 0.1 | Film 1 having vertically aligned discotic liquid crystal fixed layer | 138 | −69 | 0.3 | Parallel | A | A | B | B | B | A |
| | 16 | 150 | Fumeric acid diester polymer film 1 | 0 | −65 | 0.1 | Stretched styrene-maleic acid anhydride copoloymer film 4 | 138 | −69 | 0.3 | Parallel | A | A | B | B | B | A |
| | 17 | 150 | Aromatic cellulose acylate film 1 | 0 | −65 | 0.1 | Stretched styrene-maleic acid anhydride copoloymer film 5 | 138 | −69 | 0.2 | Parallel | B | A | B | A | B | C |
| | 18 | 150 | Fumeric acid diester polymer film 1 | 0 | −65 | 0.1 | Film 1 having vertically aligned discotic liquid crystal fixed layer | 138 | −69 | 0.2 | Parallel | A | A | A | A | A | A |
| | 19 | 150 | Fumeric acid diester polymer film 2 | 0 | −65 | 0.3 | Film 1 having vertically aligned discotic liquid crystal fixed layer | 138 | −69 | 0.2 | Parallel | A | A | B | B | A | A |
| | 20 | 150 | Fumeric acid diester polymer film 3 | 0 | −65 | 0.2 | Film 1 having vertically aligned discotic liquid crystal fixed layer | 138 | −69 | 0.2 | Parallel | A | A | A | A | A | A |
| Comparative Example | 1 | 150 | Polstyrene film 2 | 0 | −60 | 0.1 | Stretched styrene-maleic acid anhydride copoloymer film 3 | 138 | −69 | 0.2 | Parallel | B | A | B | C | B | — |
| | 2 | 90 | None | | | | Stretched styrene-maleic acid anhydride copoloymer film 3 | 138 | −69 | 0.2 | Parallel | B | A | A | C | A | — |
| | 3 | 150 | Cycloolefin film | 0 | 0 | 0.2 | None | | | | — | A | C | B | A | A | — |
| | 4 | 150 | Polyethylene terephthalate film | >300 | Unclear | 0.6 | None | | | | — | A | C | C | A | A | — |

EXPLANATION OF REFERENCES 1 phase difference layer
2 inorganic layer
3 polarizer
4 gas barrier film
5 polarizing plate
6 polarizing plate protective film
8 liquid crystal cell
10 horizontal alignment-type liquid crystal display device
21 backlight

What is claimed is:

1. A horizontal alignment-type liquid crystal display device in an in-plane switching mode comprising:
a viewing-side polarizing plate;
a liquid crystal cell;
a backlight-side polarizing plate; and
a backlight, in this order,
wherein the liquid crystal cell includes a liquid crystal layer held between two substrates,
wherein at least any one of the substrates is a polyimide resin substrate,
wherein at least one of the viewing-side polarizing plate or the backlight-side polarizing plate provided on the polyimide resin substrate side includes a gas barrier film including a phase difference layer and an inorganic layer, and a polarizer,
wherein the gas barrier film is on the polyimide resin substrate side with respect to the polarizer,
wherein retardation of the polyimide resin substrate in a thickness direction at a wavelength 550 nm is 50 nm or greater,
wherein in-plane retardation of the polyimide resin substrate at a wavelength of 550 nm is −10 nm to 10 nm,
wherein the polyimide resin substrate is on the viewing-side polarizing plate side with respect to the liquid crystal layer,
wherein a first phase difference layer satisfying nx>nz>ny is included as the phase difference layer,
wherein a second phase difference layer satisfying nz>nx=ny is further included as the phase difference layer, and
wherein a slow axis of the first phase difference phase is orthogonal to the absorption axis of the polarizer.

2. The horizontal alignment-type liquid crystal display device in an in-plane switching mode according to claim 1, wherein a substrate on the backlight-side polarizing plate side with respect to the liquid crystal layer is a glass substrate.

3. The horizontal alignment-type liquid crystal display device in an in-plane switching mode according to claim 1, wherein retardation of the polyimide resin substrate in a thickness direction at a wavelength of 550 nm is 70 nm or greater.

4. The horizontal alignment-type liquid crystal display device in an in-plane switching mode according to claim 1, wherein an inside haze of the phase difference layer is 0.01% to 0.2%.

5. The horizontal alignment-type liquid crystal display device in an in-plane switching mode according to claim 1, wherein the inorganic layer includes at least one inorganic compound selected from the group consisting of silicon nitride, silicon oxide, silicon oxynitride, and aluminum oxide.

6. A horizontal alignment-type liquid crystal display device in an in-plane switching mode comprising:
a viewing-side polarizing plate;
a liquid crystal cell;
a backlight-side polarizing plate; and
a backlight, in this order,
wherein the liquid crystal cell includes a liquid crystal layer held between two substrates,
wherein at least any one of the substrates is a polyimide resin substrate,
wherein at least one of the viewing-side polarizing plate or the backlight-side polarizing plate provided on the polyimide resin substrate side includes a gas barrier film including a phase difference layer and an inorganic layer, and a polarizer,
wherein the gas barrier film is on the polyimide resin substrate side with respect to the polarizer,
wherein retardation of the polyimide resin substrate in a thickness direction at a wavelength 550 nm is 50 nm or greater,
wherein in-plane retardation of the polyimide resin substrate at a wavelength of 550 nm is −10 nm to 10 nm,
wherein a first phase difference layer satisfying nz≥nx>ny is included as the phase difference layer,
wherein a slow axis of the first phase difference layer is parallel to an absorption axis of the polarizer, and
wherein a second phase difference layer satisfying any one of nz>nx=ny or nx=ny>nz is further included as the phase difference layer.

7. A horizontal alignment-type liquid crystal display device in an in-plane switching mode comprising:
a viewing-side polarizing plate;
a liquid crystal cell;
a backlight-side polarizing plate; and
a backlight, in this order,
wherein the liquid crystal cell includes a liquid crystal layer held between two substrates,
wherein at least any one of the substrates is a polyimide resin substrate,
wherein at least one of the viewing-side polarizing plate or the backlight-side polarizing plate provided on the polyimide resin substrate side includes a gas barrier film including a phase difference layer and an inorganic layer, and a polarizer,
wherein the gas barrier film is on the polyimide resin substrate side with respect to the polarizer,
wherein retardation of the polyimide resin substrate in a thickness direction at a wavelength 550 nm is 50 nm or greater,
wherein in-plane retardation of the polyimide resin substrate at a wavelength of 550 nm is −10 nm to 10 nm,
wherein the polyimide resin substrate is on the viewing-side polarizing plate side with respect to the liquid crystal layer,
wherein a first phase difference layer satisfying nz≥nx>ny is included as the phase difference layer,
wherein a slow axis of the first phase difference layer is parallel to an absorption axis of the polarizer, and
wherein a second phase difference layer satisfying any one of nz>nx=ny or nx=ny>nz is further included as the phase difference layer.

* * * * *